(12) United States Patent
Nishimura et al.

(10) Patent No.: US 6,237,327 B1
(45) Date of Patent: May 29, 2001

(54) FUEL COMBUSTION CONTROL SYSTEM FOR ENGINE

(75) Inventors: Hirofumi Nishimura, Hiroshima; Junichi Taga; Takahisa Ishihara, both of Higashihiroshima; Eiji Nishimura, Hiroshima, all of (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/129,554

(22) Filed: Aug. 5, 1998

(30) Foreign Application Priority Data

Aug. 6, 1997 (JP) ................................................. 9-211676
Jul. 27, 1998 (JP) ............................................... 10-211354

(51) Int. Cl.[7] ............................................................ F01N 3/00
(52) U.S. Cl. ................................... 60/276; 60/284; 60/285
(58) Field of Search ................................ 60/284, 285, 274, 60/276; 123/440; 205/784

(56) References Cited

U.S. PATENT DOCUMENTS

| | | | |
|---|---|---|---|
| 4,370,960 | * | 2/1983 | Otsuka .................................... 60/276 |
| 5,211,011 | * | 5/1993 | Nishikawa et al. ..................... 60/284 |
| 5,483,946 | * | 1/1996 | Hamburg et al. ..................... 123/686 |
| 5,652,380 | | 7/1997 | Machida . |
| 5,701,868 | * | 12/1997 | Tomisawa .............................. 60/284 |
| 5,881,552 | * | 3/1999 | Iwata et al. ............................ 60/284 |
| 5,894,724 | | 4/1999 | Minowa et al. . |

FOREIGN PATENT DOCUMENTS

| | | |
|---|---|---|
| 0719937A2 | 7/1996 | (EP) . |
| 8-61199 | 3/1996 | (JP) . |
| 8-218995 | 8/1996 | (JP) . |
| 8-232645 | 9/1996 | (JP) . |
| 9-088680 | 3/1997 | (JP) . |

OTHER PUBLICATIONS

European Search Report for Application No. EP 98 11 4819 dated Aug. 2, 2000.

* cited by examiner

*Primary Examiner*—Jeanette Chapman
*Assistant Examiner*—Sneh Varma
(74) *Attorney, Agent, or Firm*—Sidley & Austin; Hugh A. Abrams

(57) ABSTRACT

An engine control system for controlling combustion of an internal combustion engine equipped with an exhaust gas purifying catalyst. The system controls fuel combustion on the basis of control parameters including air/fuel ratio, ignition timing and intake air flow so as to cause a rise in exhaust gas temperature while an exhaust gas purifying catalyst installed in an exhaust line of the engine is insufficiently warmed or inactive. When a fluctuation of engine speed is detected, the system controls the air/fuel ratio to reach a target value close to a stoichiometric value, for example, a value between 13 and 17, and controls a control parameter other than air/fuel ratio so as to bring the fluctuation of engine speed within limits of stable combustion while the exhaust gas purifying catalyst is insufficiently warmed. The air/fuel ratio feedback control may be commenced immediately after an engine start.

11 Claims, 28 Drawing Sheets

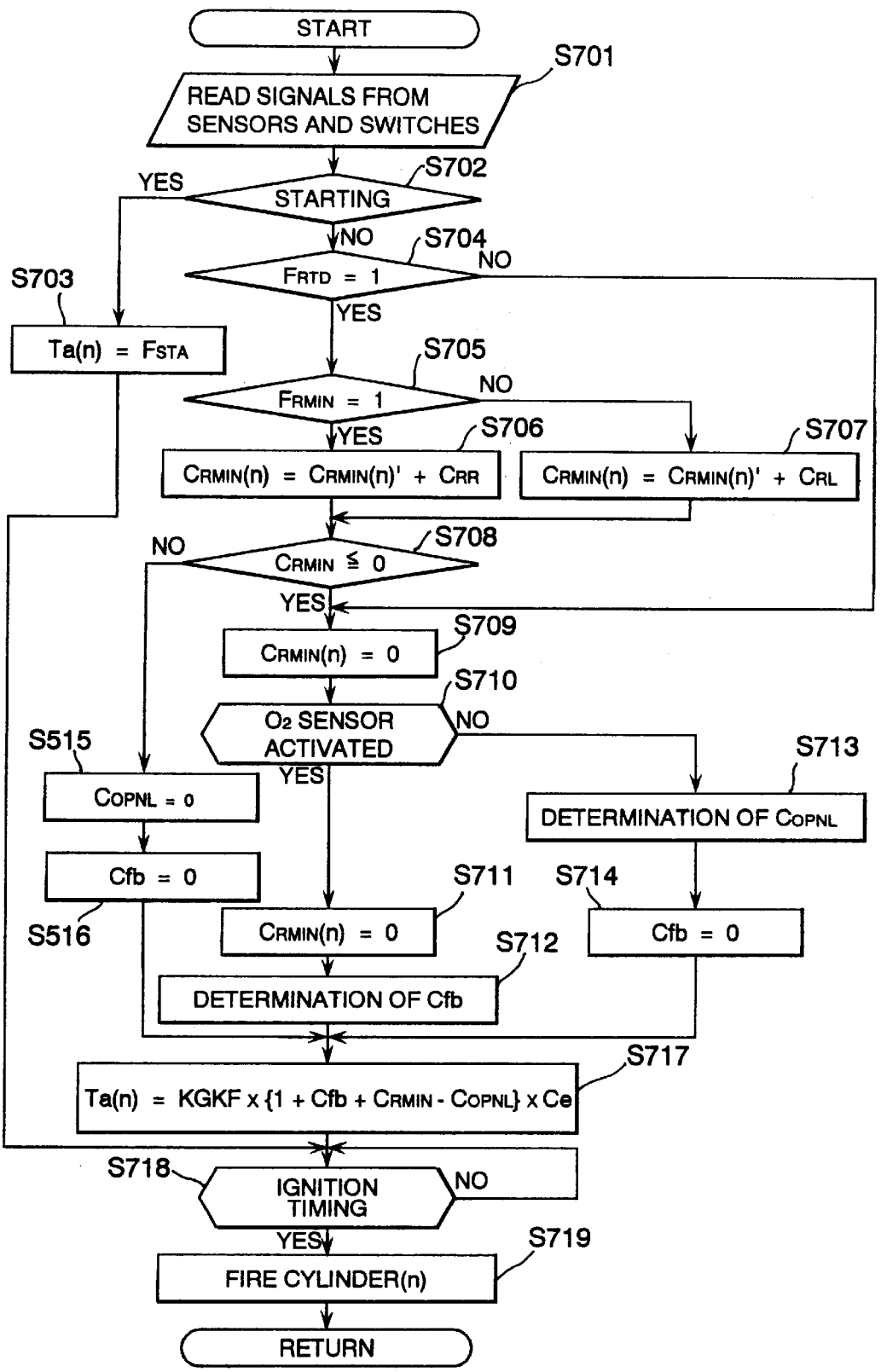

FUEL COMBUSTION CONTROL SYSTEM FOR ENGINE

BACKGROUND OF THE INVENTION

1. Field of the Invention

The invention relates to an engine control system for controlling combustion of an internal combustion engine equipped with an exhaust gas purifying catalyst, and, more particularly, to a fuel combustion control system for accelerating a rise in temperature of an exhaust gas purifying catalyst installed in an exhaust line during a cold start of the engine.

2. Description of the Related Art

Typically, there have been known various types of catalytic converters for purifying exhaust gas from an engine. Such a catalytic converter incorporates a three way catalyst to purify or significantly lower emission levels of unburnt hydrocarbons (HC), carbon monoxide (CO), oxides of nitrogen (NOx) and the like which can pose a health problem for the nation if uncontrolled. The three way catalyst is hard to present desired catalytic conversion efficiency if it is at lower temperatures and is, however, activated to present catalytic conversion efficiency when heated higher than a specific temperature sufficiently.

In this type of engine control system, it has been known to accelerate a rise in catalyst temperature by greatly retarding an ignition timing after top dead center while the catalyst has not yet attained an activated condition necessary to present desired catalytic conversion efficiency which is dictated based on a temperature of engine cooling water. One of the engine control systems of this type is known from, for example, Japanese Unexamined Patent Publication No. 8-232645. The engine control system causes a large retard of an ignition timing to provide a large amount of exhaust heat loss with an effect of rising exhaust gas temperature, as a result of which, the catalyst is quickly heated and suitably activated. Further, in order to prevent fuel combustion from being made unstable due to retarded fuel ignition, the prior engine control system is designed and adapted to improve ignitability and combustibility of an air-fuel mixture by generating a swirl of intake air in a combustion chamber, increasing a speed of an intake air stream or rising ignition energy.

It has been known as an effective control for rising exhaust gas temperature to shift an air-fuel ratio to a lean side as well as to retard an ignition timing. However, there is a somewhat conflicting problem between these control that a rise in exhaust gas temperature and stabilization of combustion are contrary to each other. Specifically, retarding an ignition timing and shifting an air-fuel ratio to a lean side in order to rise exhaust gas temperature are apt to make combustion unstable. In particular, since fuels practically used differ in quality such as the degree of fuel heaviness from one another, there is a fear of unstable combustion beyond an allowable limit due to variations of ignitability and combustibility of the fuels, which always causes engine vibrations and a sharp increase of harmful emissions. Because, while the engine is not yet warmed up, the catalyst remains inactive, there is a demand for controlling the level of harmful emissions as low as possible.

SUMMARY OF THE INVENTION

It is an objective of the invention to provide an fuel combustion control system which feedback controls an engine speed to remain within a limit on stable combustion according to fuel combustion so as to accelerate a rise in catalyst temperature and control the level of harmful emissions as well as securing stable combustion during a cold engine start.

The foregoing object of the present invention is achieved by providing a fuel combustion control system for an internal combustion engine which controls fuel combustion on the basis of control parameters including an air/fuel ratio, an ignition timing and an intake air flow so as to cause a rise in exhaust gas temperature while an exhaust gas purifying catalyst installed in an exhaust line of the engine is insufficiently warmed or inactive, detects a fluctuation of engine speed, controls an air/fuel ratio to reach a target value close to a stoichiometric value, for example a value between 13 and 17, and controls the control parameter other than air/fuel ratio so as to bring the fluctuation of engine speed within limits on stable combustion while the exhaust gas purifying catalyst is insufficiently warmed. The air/fuel ratio feedback control may be commenced immediately after an engine start.

With the fuel combustion control system of the invention, in order to accelerate a rise in catalyst temperature by, for example, retarding an ignition timing while the exhaust gas purifying catalyst is still inactive, the engine speed feedback control is performed to maintain fluctuations of engine speed within limits on stable combustion. The state of fuel combustion is detected on the basis of fluctuations of engine speed which may be detected as fluctuations of crankangular velocity, the engine is controlled to operate with speed changes close to but not exceeding limits on stable combustion, so that the engine is controlled so as to enhance acceleration of a rise in catalyst temperature as well as securing fuel combustion while the engine is still cold. Even if there is a difference in fuel quality such as heaviness between fuels due to which ignitability and combustibility varies, the same effects are realized in its own quality.

The fuel combustion control system tries to maintain an air/fuel ratio close to a stoichiometric value, so that the level of harmful emissions, such as hydrocarbons (HC) and carbon monoxide (CO), is sufficiently lowered. Further, controlling an air/fuel ratio to remain on the richer side than the stoichiometric value provides a reduction in nitrogen oxide (NOx) emission level. That is, the fuel combustion control system accomplishes both acceleration of a rise in catalyst temperature and reduction in level of harmful emissions.

The exhaust gas purifying catalyst is determined to remain inactive or to be not yet warmed up while the temperature of engine cooling water is lower than a predetermined value for a predetermined period of time. The ignition timing is retarded so as to provide a rise in exhaust gas temperature while the exhaust gas purifying catalyst remains inactive, and is, however, corrected to advance so as to maintain fluctuations of engine speed within limits on stable fuel combustion. While a retard of ignition timing accelerates a rise in catalyst temperature, it also cause a fluctuation of engine speed, the fuel combustion control system controls the fluctuation of engine speed to remain within the limits by advancing the ignition timing, so as to stabilize fuel combustion.

The fuel combustion control system may incorporate variable air intake means such as an idle speed control valve for increasingly and decreasingly changing intake air quantity bypassing an engine throttle and admitted to the engine and an idle sensor for detecting engine idling. When the engine is idling, the fuel combustion control system controls the variable air intake means to provide an increase in intake air quantity. Specifically, while the engine idling with the engine throttle remaining fully closed, the variable air intake means is opened according to fluctuations of engine speed, so that air charging efficiency is increased to cause the engine to provide an increased output with an effect of enhancing fuel combustion stability. The fuel combustion control system may control the variable air intake means so as to cause the engine to provide an increase in engine speed while the engine is cold, which yields more enhanced stability of engine speed. Specifically, the fuel combustion control system feedback controls the variable air intake means so as to cause the engine to attain a predetermined idle speed. This control prevents the driver and passengers from loosing natural feeling. Further, the control system may control the variable air intake means so as to intensify an air flow in the combustion chamber with acceleration of mixing air and fuel while the engine is cold, which prevents aggravation of fuel vaporization and keeps ignitability of fuel.

The fuel combustion control system may incorporates an air/fuel ratio sensor, such as an oxygen ($O_2$) sensor, installed in the exhaust line which is activated after an engine start to detect oxygen concentration of an exhaust gas from the engine which represents an air/fuel ratio of a burnt air-fuel mixture. In this case, the fuel combustion control system, on one hand, performs air/fuel ratio feedforward control while the air/fuel ratio sensor remains inactive and, on the other hand, performs air/fuel ratio feedback control based on the air/fuel ratio detected by the air/fuel ratio sensor after activation of the air/fuel ratio sensor.

After the air/fuel ratio sensor has been warmed up and normally activated once, the air/fuel ratio is feedback controlled on the basis of an output of the air/fuel ratio sensor, The level of harmful emissions is sufficiently lowered. The air/fuel ratio feedforward control tries to maintain a target air/fuel ratio between 13 and 17. The target air/fuel ratio may be established as a value richer than a stoichiometric air/fuel ratio. According to the air/fuel ratio feedforward control, until the air/fuel ratio sensor is still inactive while the engine is cold, an air-fuel mixture is enriched, so that, although there occurs aggravation of fuel vaporization, fuel combustion is stabilized. As long as an air/fuel ratio is maintained closely to stoichiometric air/fuel ratio, the level of three harmful emissions are not so high. Further, the target air/fuel ratio may be established as a value leaner than a stoichiometric air/fuel ratio. That is, when the air/fuel ratio is close to but learner than the stoichiometric value, namely a value between 14.7 (stoichiometric value) and 17.0, the exhaust gas attains the highest temperature. Accordingly, the fuel combustion control system in which an air/fuel ratio is controlled to be learner than the stoichiometric value while the engine is cold, and hence the exhaust gas purifying catalyst remains inactive, a rise in catalyst temperature is accelerated with an effect of significantly lowering the level of harmful emissions. Further, when the target air/fuel ratio is a stoichiometric value, while the level of harmful emissions is lowered, the exhaust gas purifying catalyst works with sufficient conversion efficiency if only attaining semi-activation.

The target air/fuel ratio may be changed on the basis of fluctuations of engine speed. This makes it possible to stabilize fuel combustion by correcting an air/fuel ratio to the richer side when fuel combustion remains unstable even after execution of combustion control. For example, even if using a fuel containing a large part of heavy component and being of significantly inferior ignitability and combustibility, the engine is prevented from strengthening vibrations and increasing harmful emissions.

The fuel combustion control system may restrain the advancing correction of ignition timing to maintain an air/fuel ratio smaller than the target value for a period of time immediately after an engine start while the exhaust gas purifying catalyst remains inactive and, after a lapse of the predetermined period of time, controls the air/fuel ratio to reach the target value. As was previously described, generally, when maintaining an air/fuel ratio learner, for example between 14.7 and 17.0, than a stoichiometric value, the exhaust gas attains the highest temperature. In view of the circumstance, according to the fuel combustion control system of the invention, the control of a rise in catalyst temperature by retarding an ignition timing is given priority by maintaining an air-fuel ratio richer than a target value for the predetermined period of time, for example 10 seconds, immediately after an engine start. During this priority control of a rise in catalyst temperature, the level of NOx emission is lowered due to the air/fuel ratio maintained rich. After a lapse of the time period, the exhaust gas purifying catalyst having been semi-activated effectively works to lower the level of three harmful emissions. That is, the fuel combustion control system achieves both acceleration of a rise in catalyst temperature and a reduction in harmful emission level with high precision.

In the above embodiments, fluctuations of engine speed is detected for every cylinder, on the basis of which the air/fuel ratio control and the fuel combustion control are performed for every cylinder. Since there are generally differences in fuel injection quantity, combustion temperature and air flow among cylinders of an engine and, if the control are executed for all cylinders together, limits on combustion stability are governed by a specific one of the cylinders which has inferior combustibility, an ignition timing is retarded allowing more retardation for each remaining cylinder. According to the fuel combustion control system, an ignition timing is controlled independently for each cylinder on the basis of fluctuations of engine speed monitored independently for the cylinder, so that the ignition timing is retarded to a limit on combustion stability inherent in the cylinder.

The exhaust gas purifying catalyst is desirably disposed downstream from an exhaust manifold connected to the exhaust line. This layout makes the fuel combustion control system possible to enhance acceleration of a rise in catalyst temperature. In other words, the layout of catalyst provides a high degree of design freedom, which realizes an increase in engine output power by the improvement of exhaust efficiency and utilization of exhaust inertia as well as acceleration of a rise in catalyst temperature.

BRIEF DESCRIPTION OF THE DRAWINGS

The foregoing and other objects and features of the present invention will be clearly understood from the following detailed description of preferred embodiments when read in conjunction with the accompanying drawings in which:

FIG. 34 is a flow chart illustrating a variation of the sequence routine of fuel injection control shown in FIG. 19.

DETAILED DESCRIPTION OF THE PREFERRED EMBODIMENT

Figure 1:
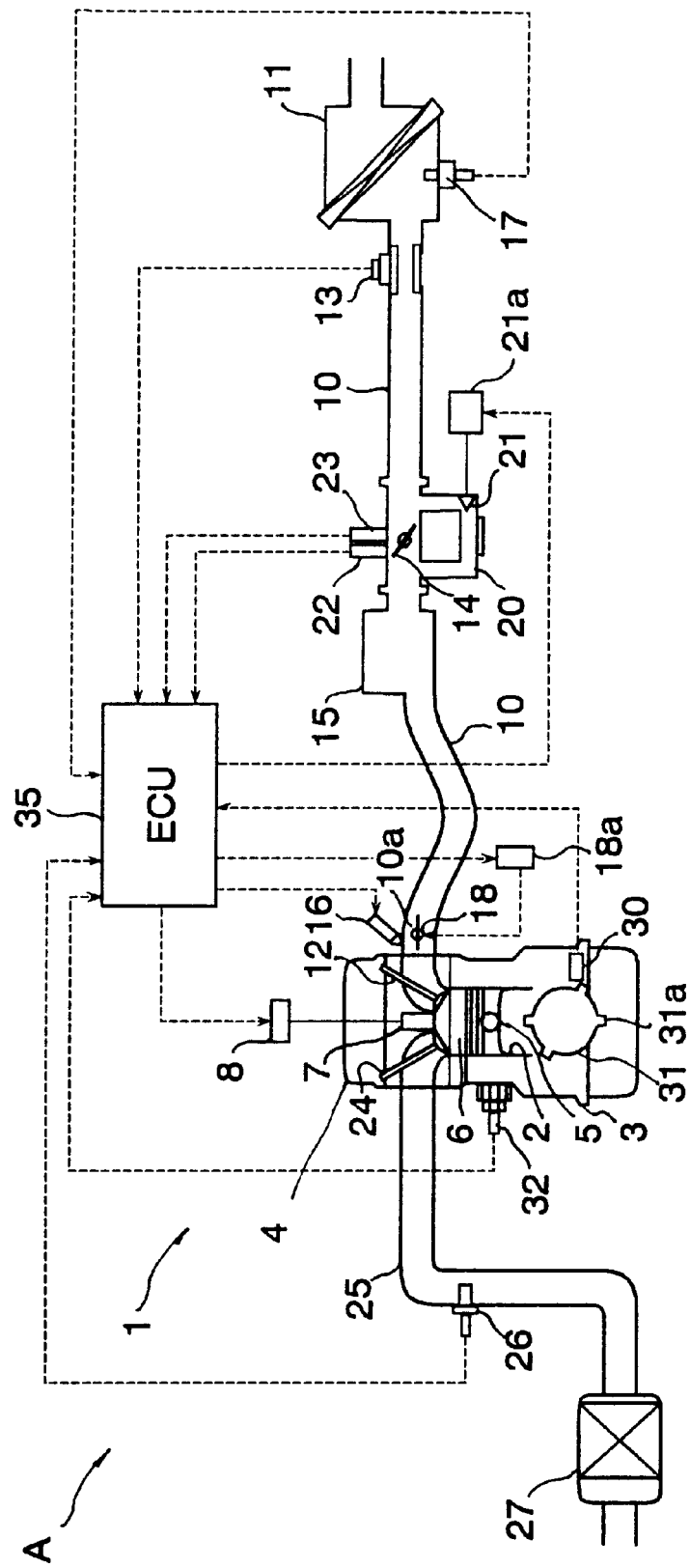
FIG. 1 is a schematic illustration showing the overall structure of an internal combustion engine equipped with a fuel combustion control system in accordance with an embodiment of the invention.

Referring to the drawings in detail and, in particular, to FIG. 1 showing an in-line four cylinder, four-stroke cycle gasoline engine 1 (which is hereafter referred to as an engine for simplicity) equipped with a fuel combustion control system A in accordance with an embodiment of the invention, the engine 1 is comprised of a cylinder block 3 and a cylinder head 4. The cylinder block 3 is provided with four cylinders 2 (only one of which is shown) in which pistons 5 can slide. A combustion chamber 6 is formed in each cylinder 2 by the top of the piston 5, a lower wall of the cylinder head 4 and a wall of the cylinder 2. A spark plug 7, which is installed into the cylinder head 4 at the center with the electrode tip placed down into the combustion chamber 6, is connected to an ignition circuit 8 including an igniter for electronically controlling, an ignition timing. An intake valve 12 and an exhaust valve 24 open and shut an intake port and an exhaust port opening into the combustion chamber 6, respectively, at a predetermined timing. An intake passage 10 is connected to the intake port of the combustion chamber 6 at one of its ends and to an air cleaner 11 at another end. The intake passage 11 is provided with a hot-wire type of air flow sensor 13 for detecting an intake air quantity introduced into the intake passage 10, a throttle valve 14, a surge tank 15 and a fuel injector 16 in order from the upstream end. An electronic control unit (ECU) 35 comprised of a microprocessor provides an injector pulse to open the fuel injector for a time determined by a pulse width of the injector pulse. The air cleaner 11 incorporates a temperature sensor 17 to monitor the temperature of air entering the intake passage 10. The intake passage 10 at its downstream end branches off into a first branch intake passage (which is bidden in the figure) and a second branch intake passage 10a in which an electrically actuated swirl valve 18 is installed. The swirl valve 18 is controlled by an actuator 18a such as a stepping motor to open and close. When the swirl valve 18 closes, the branch intake passage 10a is almost completely shut to cause an intake air stream to flow into the combustion chamber 6 through the first branch intake passage only so as thereby to produce a swirl in the combustion chamber 6. A bypass intake passage 20, which is essentially used for idle speed control, is connected to the intake passage 10 to allow an intake air stream to flow bypassing the throttle valve 14 and incorporates an idle speed control valve 21. Changing a point of opening of the idle speed control valve 21 controls an intake air quantity flowing through the bypass intake passage 20 to control an engine speed during idling. The throttle valve 14 is provided with an idle switch 22 to detect that the engine 1 is idling and a throttle position sensor 23 to monitor a point of opening of the throttle valve 14.

An exhaust passage 25 at its up stream end is formed with an exhaust manifold branching off into four exhaust passages, each of which is connected to the exhaust port of the combustion chamber 6. The exhaust passage 25 is provided with an oxygen (O2) sensor 26 downstream from the exhaust manifold to monitor an air/fuel ratio within the combustion chamber and a catalytic converter 27 disposed downstream from the O2 sensor 26. The air fuel ratio is dictated by the oxygen concentration in exhaust gas detected by the O2 sensor 26. An output from the O2 sensor 26 sharply changes on opposite sides of an air/fuel ratio for a stoichiometric air/fuel mixture. The catalytic converter 27 has a three way catalyst capable of lowering an emission level of unburnt hydrocarbons (HC), carbon monoxide (CO) and oxides of nitrogen (NOx) and is desirable to lower an emission level of oxides of nitrogen (NOx) even when a lean mixture is burnt.

A crankangle sensor 30 comprising one of electromagnetic pick-up devices is provided to detect an angle of rotation of a crankshaft (not shown) of the engine 1 by which an engine speed is dictated. The crankangle sensor 30 cooperates with a disk 31 secured to an end of the crankshaft. The disk 31 has a plurality of radial projections 31a arranged at regular angular intervals. The crankangle sensor 30 detects the radial projections and provides pulse signals. Further, a temperature sensor 32 is provided to monitor a cooling water temperature Tcw.

Figure 2:
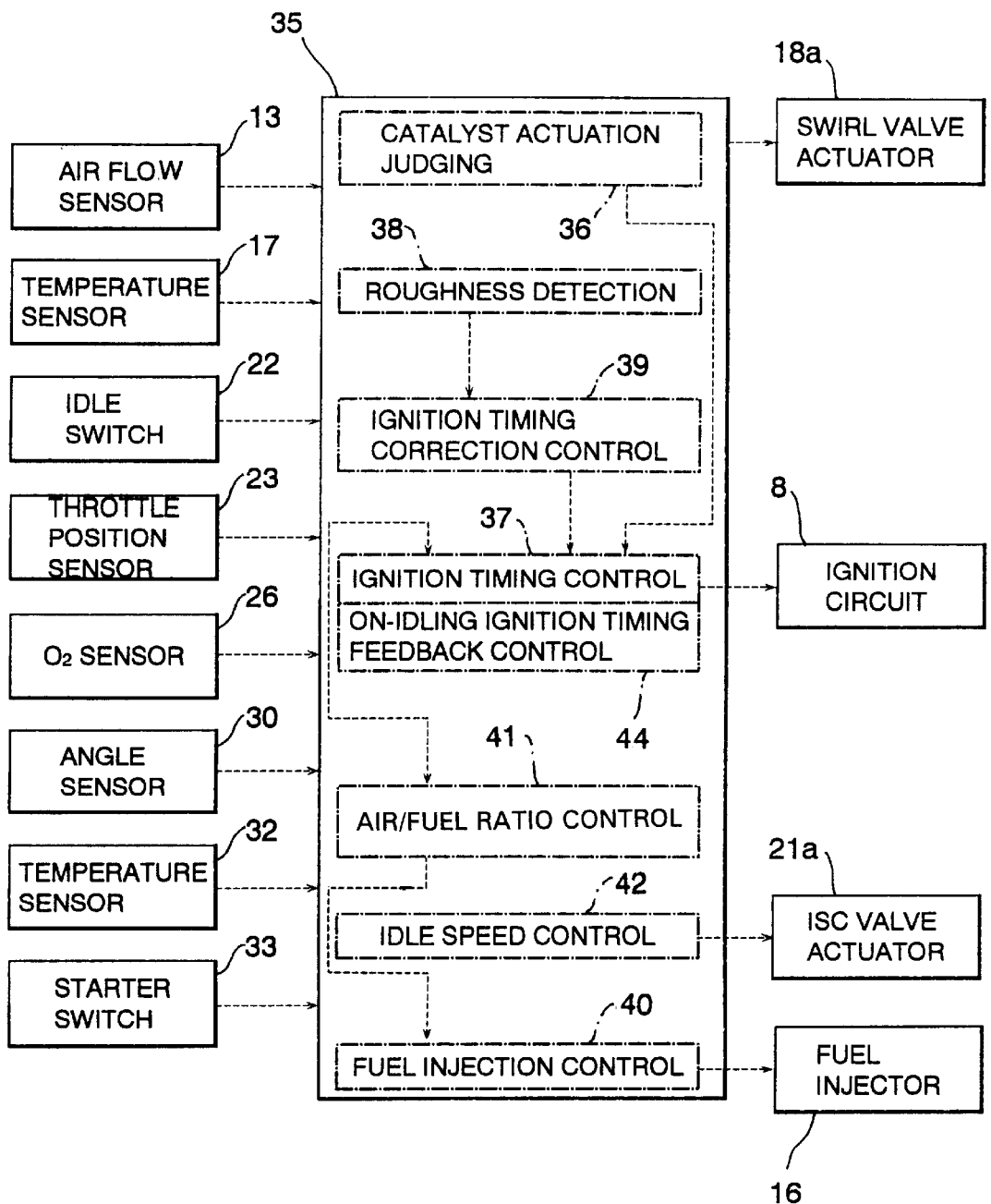
FIG. 2 is a schematic block diagram showing an engine control unit.

As shown in FIG. 2, the ECU 35 receives signals from various sensors and switches including the air flow sensor 13, the intake air temperature sensor 17, the idle switch 22, the throttle position sensor 23, the O2 sensor 26, the crankangle sensor 30, the water temperature sensor 32 and a starter switch 33 and provides control signals including an injector pulse to the fuel injector 16, an ignition signal to the ignition circuit 8, actuator signals to the actuators 18a and 21a of the swirl valve 18 and the idle speed control valve 21, respectively. The ECU 35 governs control of retarding an ignition timing to accelerate a rise in catalyst temperature with secured combustion stability after a cold engine start as well as fuel injection control for trying to maintain a stoichiometric air/fuel ratio and, during idling, control of increasing an intake air quantity to improve stability of rotation with an effect of rising catalyst temperature. Specifically, the ECU 35 has a functional block (catalyst activation detection block) 36 for judging whether the catalyst of the catalytic converter 27 has been warmed and activated based on a lapse of time from an engine start and a temperature of engine cooling water and a functional block (ignition timing control block) 37 for retarding an ignition timing to accelerate a rise in catalyst temperature after suitable activation of the catalyst. Further, the ECU 35 has a functional block (roughness detection block) 38 for detecting a fluctuation in crankangular velocity, a functional block (ignition timing correction control block) 39 for correcting an ignition timing determined by the ignition timing control block 37 according to fluctuations in crankangular velocity, a functional block (fuel injection control block) 40 for controlling a fuel injection quantity to try to maintain a stoichiometric air/fuel ratio during execution of the ignition timing retard control, a function block (air/fuel ratio correction block) 41 for enriching an air/fuel mixture to increase an air/fuel ratio when a fluctuation in crankangular velocity is still large even after a correction by retarding an ignition timing, and a functional block (idle speed control block) 42 for controlling the idle speed control valve 21 to provide an increase in the intake air quantity introduced into the engine during idling. The ECU 35 further has a functional block (idle speed feedback control block) 44 for feedback controlling an engine speed by adjusting an ignition timing so as to maintain a specified idle speed.

Figure 3:
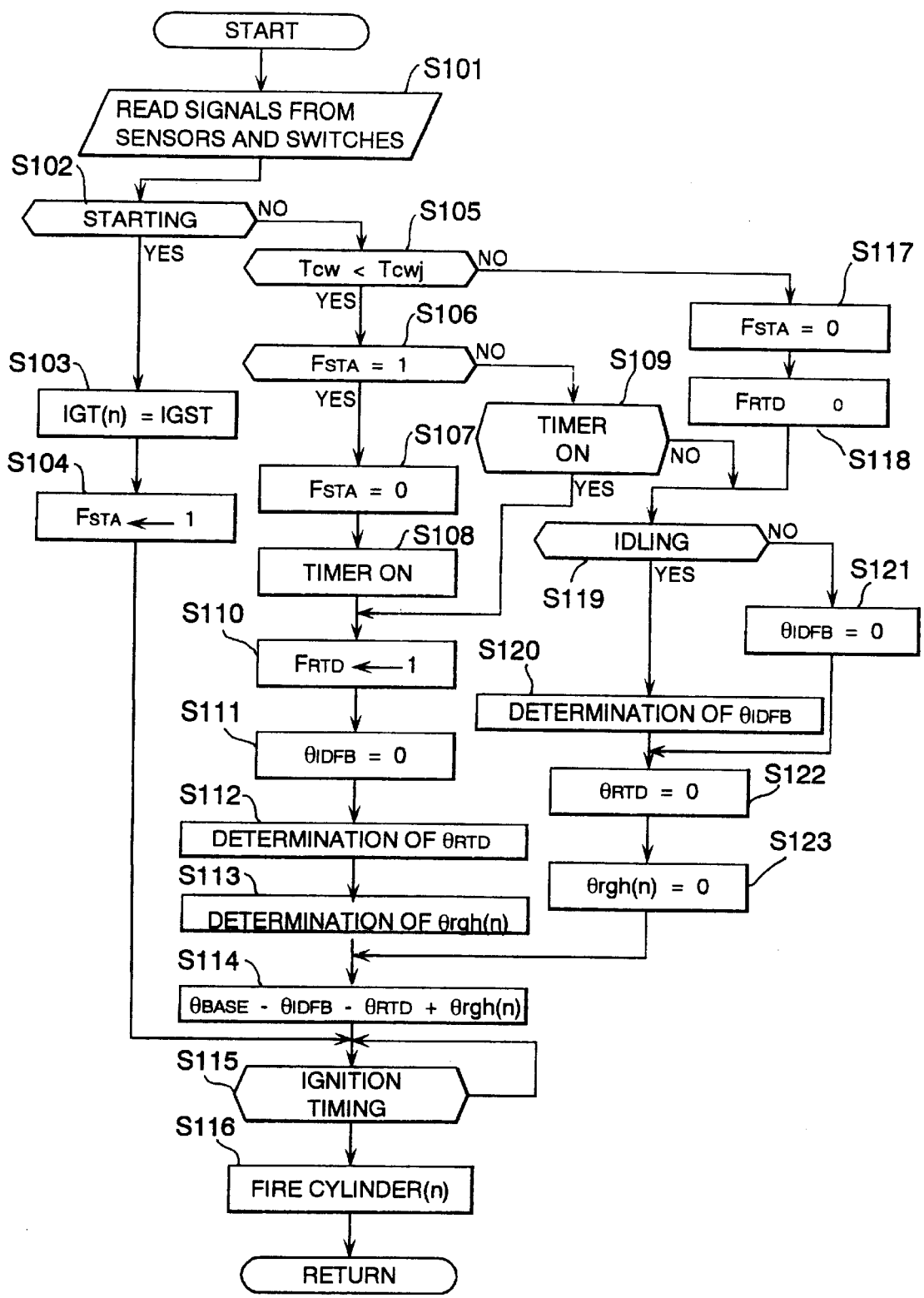
FIG. 3 is a flow chart illustrating a sequence routine of ignition timing control.

FIG. 3 is a flow chart illustrating a sequence routine of the ignition timing control for the microprocessor of the ECU 35.

As shown, the flow chart logic commences and control proceeds directly to a function block at step S101 where the ECU 35 reads signals from the sensors and switches including the air flow sensor 13, the intake air temperature sensor 17, the idle switch 22, the throttle position sensor 23, the O2 sensor 215, the crankangle sensor 30, the water temperature sensor 32 and a starter switch 33 (see FIG 2). Subsequently, at step S102, a judgement is made as to whether the engine 1 is starting. When there is no signal from the starter with which a starter motor is actuated or an engine speed is lower than a specified rate, the engine is judged to be not starting. When the engine 1 is starting, an ignition timing IGST during engine starting is taken as an ignition timing IGT(n) at step S103, and a start flag FSTA is set up to a state of "1" which indicates that the engine is starting at step S104. When the ignition timing IGT(n) for each cylinder has come at step S115, the spark plug 7 of the cylinder is actuated to fire at step S116. The suffix (n) designates cylinder numbers, first to fourth cylinders. In this instance, the cylinder numbers 1, 2, 3 and 4 designate first, third, fourth and second cylinders, respectively.

On the other hand, when the engine is not starting, a judgement is made at step S105 as to whether an cooling water temperature Tcw is lower than a specified point Tcwo, for example 60° C. When the cooling water temperature Tcw is lower than the specified point Tcwo, (60° C.), this indicates that the engine is still cold and hence the catalyst is not yet activated, then, another judgement is made at step S106 as to whether the start flag FSTA is up to the state of "1." When it is up, after resetting down the start flag FSTA at step S107, a timer is actuated to count a specified heating time Tht for which a rise in catalyst temperature is accelerated at step S108. When the start flag FSTA is down, a judgement is made at step S109 as to whether the timer has been actuated and is counting down the heating time Tht. When the timer has been actuated and is counting the heating time Tht, the catalyst of the catalytic converter 27 is judged to be under warming-up, then, an ignition timing IGT(n) is determined through steps S110 to S114.

After setting up a temperature rising flag FRTD to a state of "1" which indicates that a rise in catalyst temperature Tcat is under acceleration by retarding an ignition timing at step S110, a feedback control variable $\theta_{IDFB}$ for an ignition timing necessary to keep an idle speed Nid remain constant is set to 0 (zero) at step S111 and an ignition timing control variable $\theta_{RTD}$ for ignition timing retardation is read on an ignition timing retardation control map at step S112. Setting the feedback control variable $\theta_{IDFB}$ to 0 (zero) meas to interrupt the feedback control of idle speed by the ignition timing control. The ignition timing retardation control map specified air charging efficiency with respect to engine loading and ignition timing control variable $\theta_{RTD}$ with respect to engine speed. The air charging efficiency is determined by dividing an intake air quantity detected by the air flow sensor 13 by an engine speed and multiplying the quotient and a specific fixed number together. At step S113, a calculation is made to obtain a roughness control variable $\theta_{rgh}(n)$ for each cylinder which is used to correct an ignition timing so as to put fluctuations of crankangular velocity within limits on stable combustion and will be described later. Subsequently, at step S114, an ignition timing IGT(n) is given by the following expression:

$$IGT(n) = \theta_{BASE} - \theta_{IDFB} - \theta_{RTD} + \theta_{rgh(n)}$$

where $\theta_{BASE}$ is a basic ignition timing expressed by angle which is ordinarily slightly retarded from a specified ignition timing, for example 10° before top dead center, at which the engine 1 produces maximum torque in (each cylinder and corresponds to engine speed and air charging efficiency.

When it is judged at step S115 that the ignition timing IGT(n) calculated at step S103 or S115 has come, the spark plug 7 of the cylinder is actuated to fire at step S116.

As apparent from the above description, for a period of time until the heating time Tht has passed after a cold start of the engine 1, while the ignition timing is retarded to rise the temperature of exhaust gas so as thereby to accelerate a rise in catalyst temperature, the ignition timing is corrected according to a fluctuation of crankangular velocity to control the engine 1 within limits on stable (combustion.

On the other hand, when the cooling water temperature Tcw is higher than the specified point Tcwo, namely 60° C., this indicates that the engine has been warmed up and hence the catalyst has been activated, then, after resetting from the start flag FSTA and the temperature rising flag FRTD at step S117 and S118, respectively, a judgement is made at step S119 as to whether the engine 1 is idling. This judgement id made based on a signal from the idle switch 22. During idling, the idle switch 22 detects a closed position of the throttle valve 14 and providing a signal representing that the engine is idling. When the engine 1 is idling, a feedback control variable $\theta_{IDFB}$ is read from a control map. This map specifies feedback control variables $\theta_{IDFB}$ with respect to differences between engine speed and idle speed. When the engine 1 is not idling, the feedback control variable $\theta_{IDFB}$ is set to 0 (zero) at step S121. After determination of the feedback control variable $\theta_{IDFB}$ at step S120 or at step S121, both ignition timing control variable $\theta_{RTD}$ and roughness control variable $\theta_{rgh}(n)$ are set to 0 (zero) at steps S122 and S123, respectively. Subsequently, through steps S114 to S116, an ignition timing IGT is calculated, and the spark plug 7 of a cylinder is actuated to fire at the ignition timing. That is, when the cooling water temperature Tcw is higher than the specified point Tcwo or when the heating time Tht has passed from an engine start, the ignition timing control for acceleration of a rise in catalyst temperature is terminated through steps S122 and S123 and the ordinary ignition timing control takes place. When the throttle valve 14 is fully closed, the ignition timing feedback control is performed to regulate an ignition timing so as to keep an engine speed suitable for idling through steps S119 and S120. In this manner, the idle speed feedback control is performed with favorable responsiveness by controlling an idle speed through regulation of an ignition timing.

Figure 4:
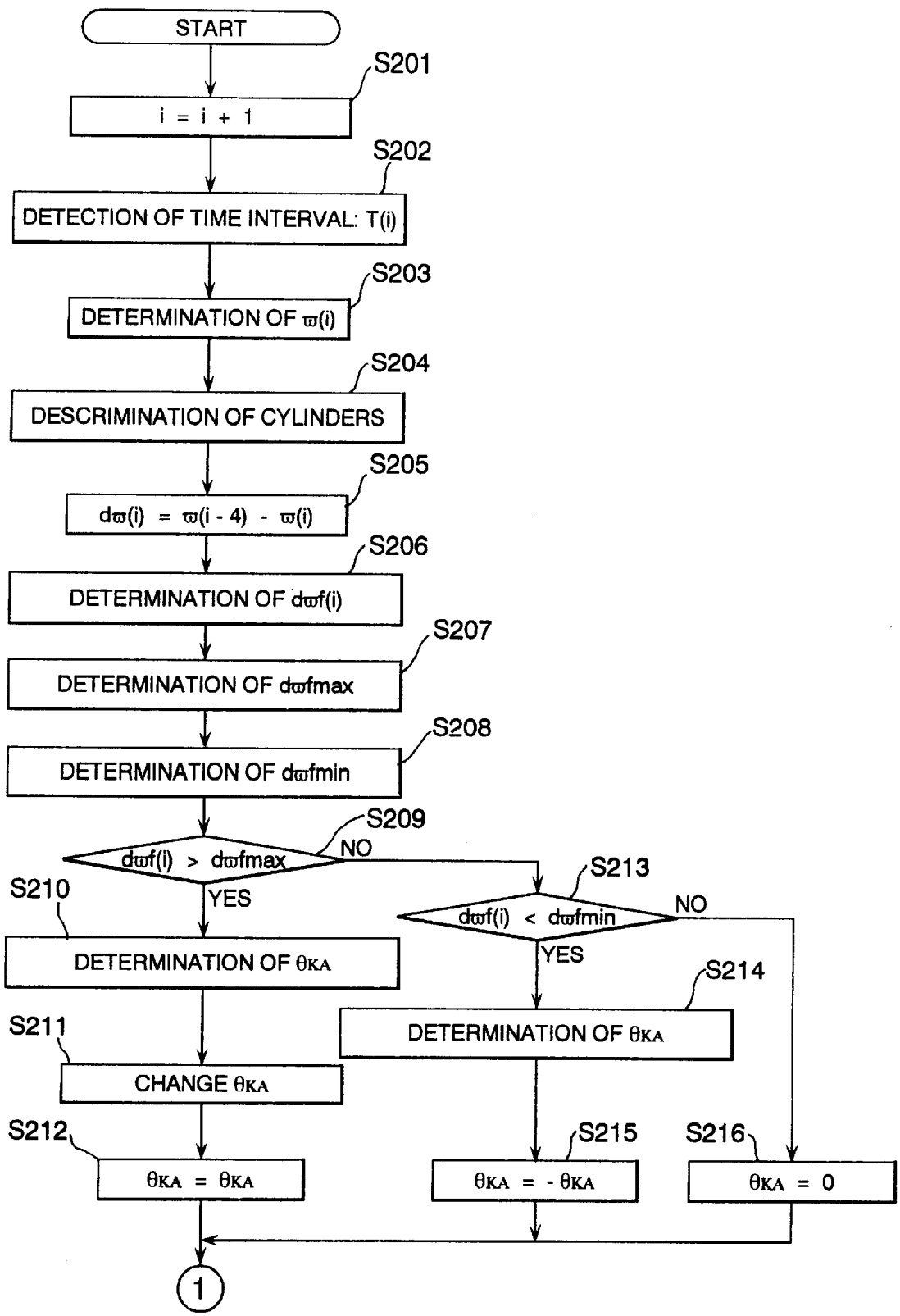
FIGS. 4 and 5 are a flow chart illustrating a sequence routine of roughness control gain setting and an angular velocity fluctuation detection in a roughness control variable calculation.
Figure 5:
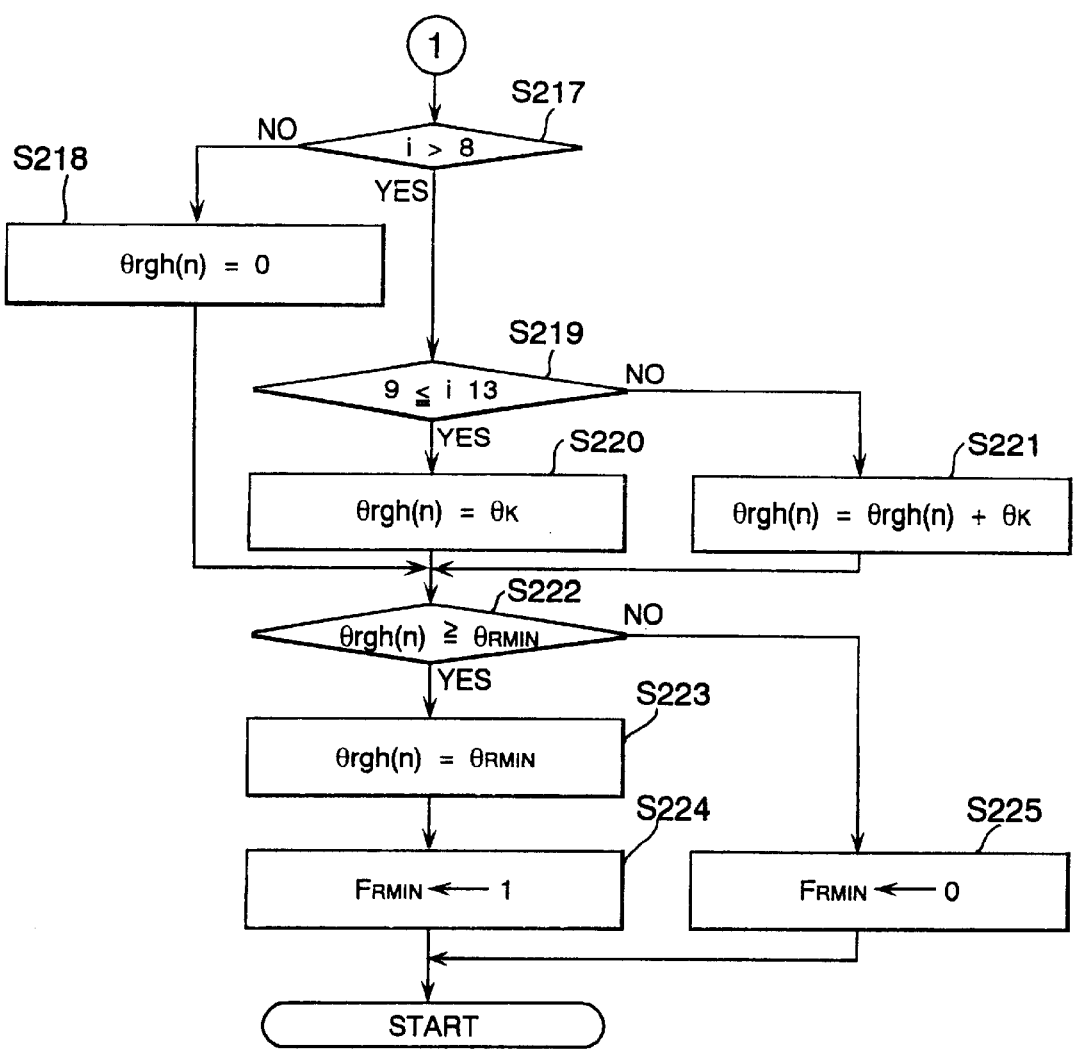

FIGS. 4 and 5 are a flow chart illustrating a sequence routine of the control of determining a roughness control variable $\theta_{rgh}(n)$ made at step S113 of the ignition timing control shown in FIG. 3.

As shown, the flow chart logic commences and control proceeds directly to a function block at step S201 where a control cycle, whose initial value is 1 (one), is incremented by one. Subsequently, a time interval T(i) between adjacent signals from the crankangle sensor 30 is measured at step S202, and a crankangular velocity ω(i) of a specified period of time is calculated based on the time interval T(i) at step S203. The period of time within which a crankshaft angular velocity is calculated is determined as described below.

Figure 6:
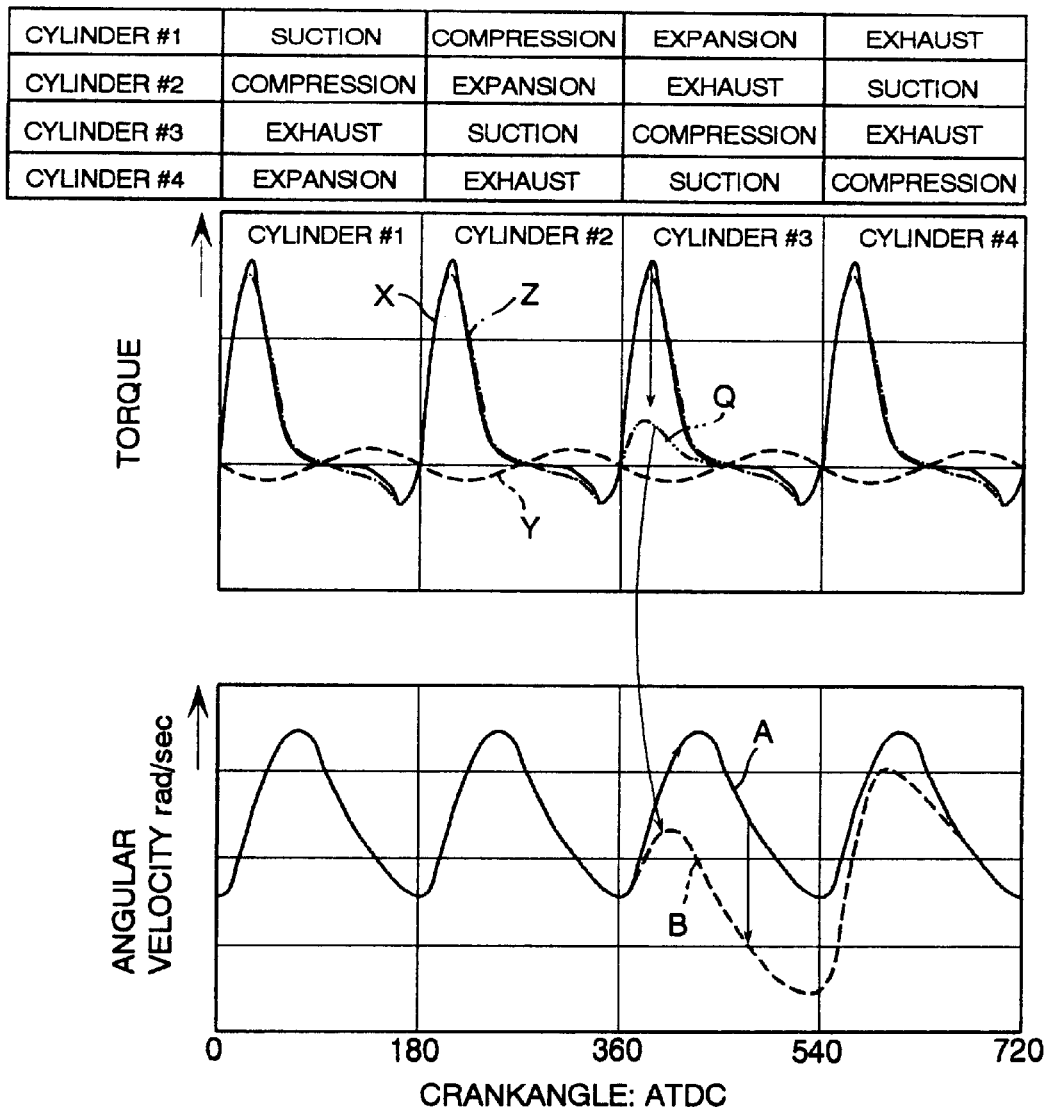
FIG. 6 is a diagram showing a change in torque and angular velocity relative to a fluctuation of crank angle for a four-stroke cycle, four cylinder engine.

FIG. 6 shows engine torque and angular velocity with respect to crankangle in connection with an in-line four-cylinder, four-stroke cycle engine. Relating to each cylinder 2, Resultant torque (shown by solidly line X) of torque of inertia (shown by a broken line Y) and torque of gas pressure (shown by a dotted broken line Z) changes periodically at angular intervals of 180° during normal combustion and an angular velocity (indicated by a label "A") of the crankshaft rotated by the resultant torque changes periodically. On the other hand, there occurs the state where a combustion in, for example, the number 1 cylinder 2 becomes as unstable as a semi-misfire occurs, the resultant torque exceedingly drops as shown by a double-dotted broken line Q. As a result, a crankangular velocity significantly drops from the middle of an expansion stroke as shown by a broken line B, a difference of the crankangular velocity during unstable combustion from that during normal combustion is expanded. In connection with the number 3 cylinder next to the number 1 cylinder 2, although the crankangalar velocity lowers at the middle of an expansion stroke due to an effect of the preceding cylinder, namely the number 1 cylinder in this embodiment, it reaches gradually a crankangular velocity for normal combustion with progress of the expansion.

Figure 7:
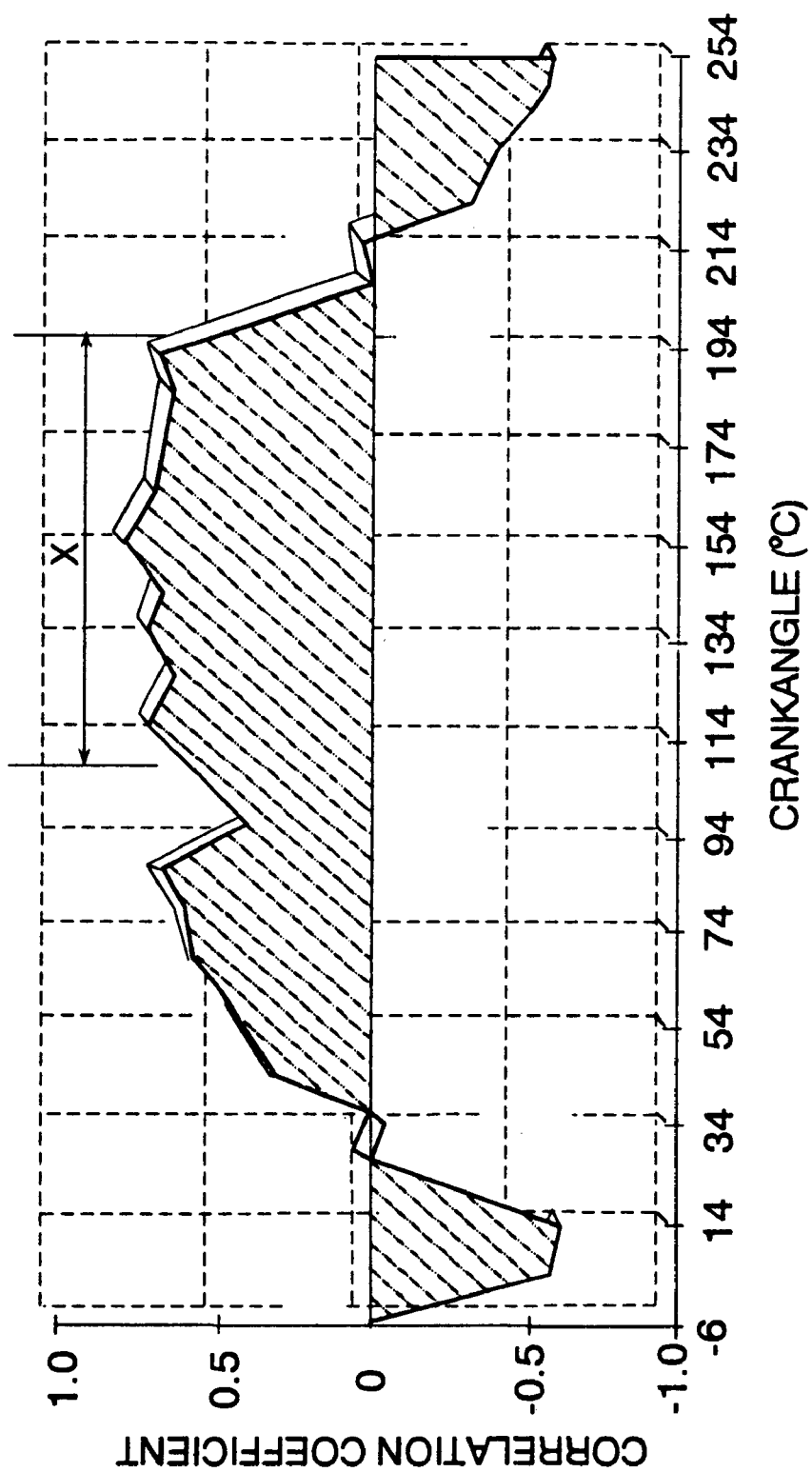
FIG. 7 is a graphical diagram showing the relationship between combustion pressure and a fluctuation of angular velocity.

FIG. 7 shows combustion gas pressure represented by a correlation coefficient relative to a fluctuation in crankangular velocity after top dead center of a compression stroke of a specific cylinder. Correlation coefficient is a measurement of how the gas pressure relating a specific cylinder has an effect on crankangular velocity. A plus value of correlation coefficient indicates that a change in gas pressure of the specific cylinder has strong correlation to the fluctuation in crankangular velocity of the specific cylinder, and a minus value of correlation coefficient indicates that a change in gas pressure of a preceding cylinder has strong correlation to the fluctuation in crankangular velocity of the specific cylinder.

As apparent from FIGS. 6 and 7, the correlation between combustion gas pressure and a fluctuation in crankangular velocity is strong between a crankangle at which combustion is almost completed (approximately 40° ATDC) and a crankangle at which the following cylinder almost starts combustion approximately 200° ATDC) and it is significantly strong in particular in a period X where inertial torque is increased, i e. between crankangles 100 and 200° ATDC) after an inflection point of gas pressure torque (at a crankangle of 90° ATDC). Accordingly, a combustion state of a specific cylinder is precisely determined on the basis of a fluctuation in crankangle of the specific cylinder by detecting a crankangular velocity within an extent between crankangles of, for example, 100 and 200°. In order to provide a long allowable time for crankangle detection, it is desirable to make crankangle detection after a crankangle of 60°.

Figure 8:
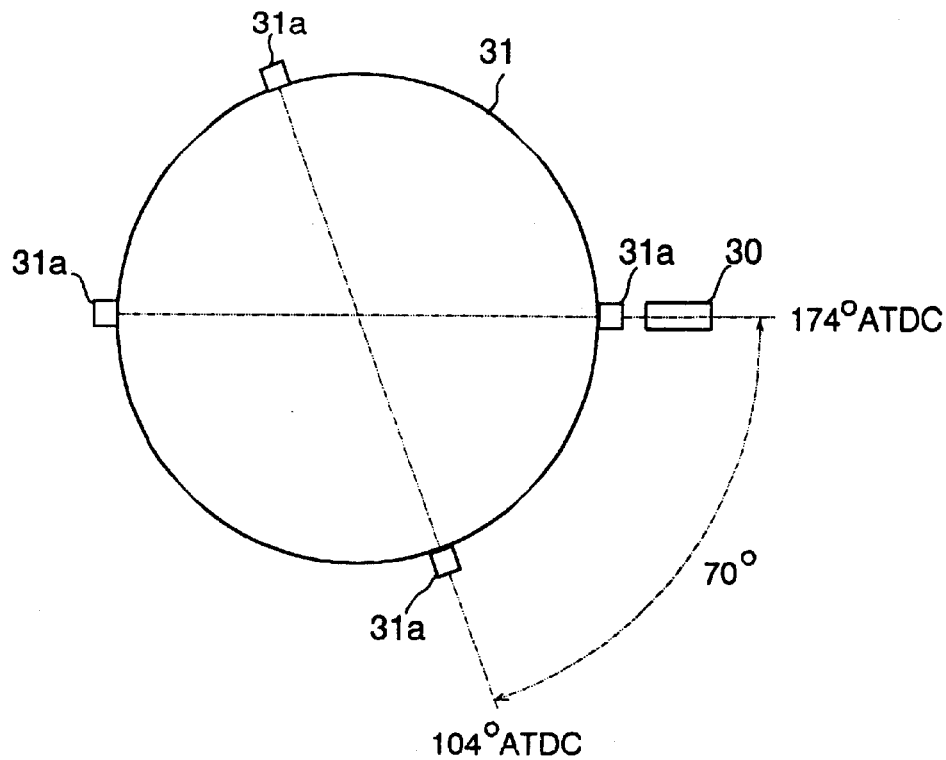
FIG. 8 is a schematic illustration showing a structure of a crankangle sensor and a detected plate.

In view of the above circumstances, as shown in FIG. 8, the detected plate 31 is formed with the radial projections 31a at angular intervals such that the radial projection is detected at crankangles of 104° ATDC and 174° ATDC of each cylinder to find a crankangular velocity during a rotation of the crankshaft through 70° from a crankangle of 104° ATDC to a crankangle of 174° ATDC. Therefore, the following expression is used to calculate a crankangle velocity ω of a specific cylinder (i) at step S203.

$$\omega(i) = 70 \times 10^6 T(i)$$

Figure 9:
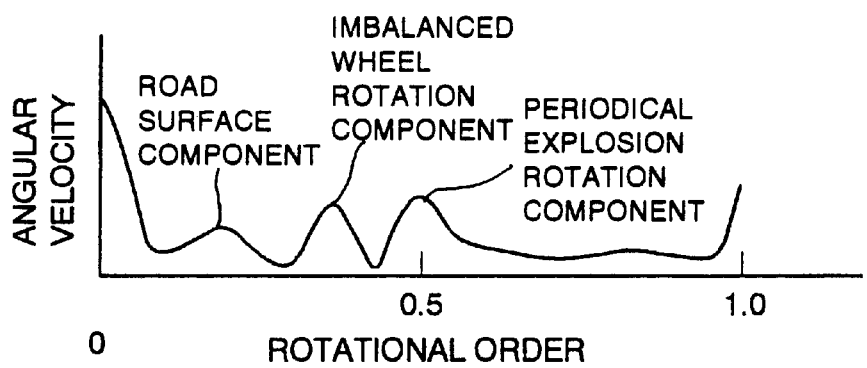
FIG. 9 is a graphical diagram showing fluctuations of crankangular velocity due to factors like noises.

Thereafter, after discriminating cylinders based on signals provided by a sensor (not shown) for monitoring a rotational angle of a camshaft (not shown) at step S204, a fluctuation in crankangular velocity ω(i) is determined removing factors which are noises to determination of a combustion state of each cylinder through steps S205 and S206. There are factors, excepting a change in combustion state, which cause fluctuations of crankangular velocity ω(i) such as resonance due to explosive combustion, imbalanced rotation of wheels, vibrations due to road surface conditions transmitted through wheels and the like. As shown in FIG. 9, components of crankangular velocity fluctuations resulting from explosive rotation as noises due to the resonance occur in a frequency of rotational orders of 0.5 and its integral multiples. However, components of crankangular velocity fluctuations as noises due to imbalanced wheel rotation and road surface conditions occur in a frequency band of rotational orders less than 0.5.

Figure 10:
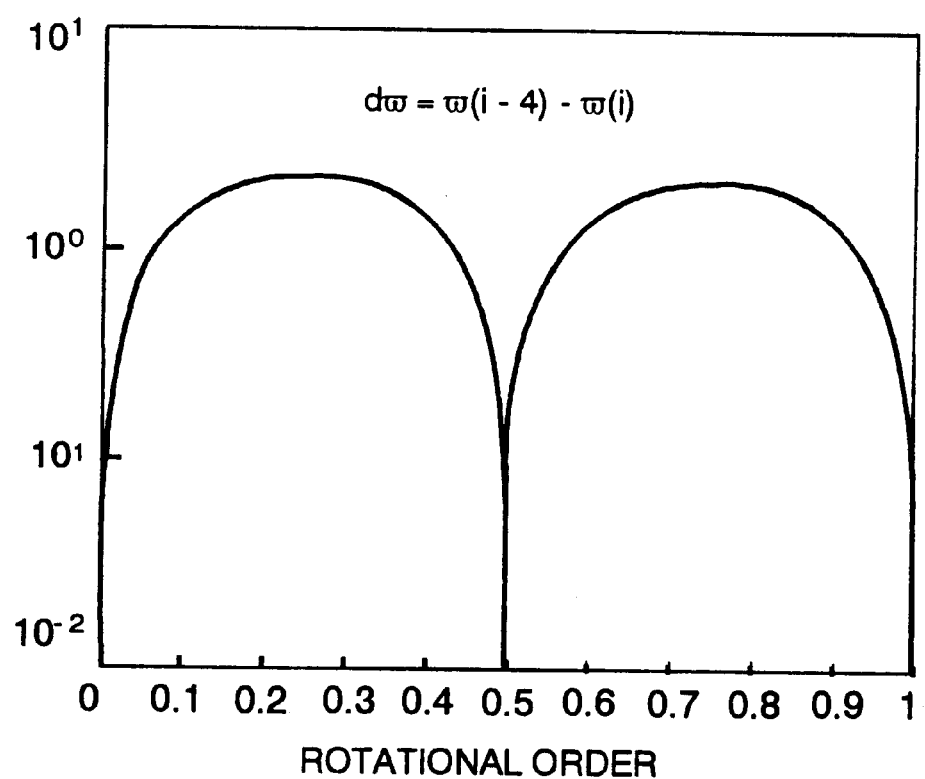
FIG. 10 is a graphical diagram showing crankangular velocity from which frequency components of rotational engine speed of orders of 0.5 and integral multiples of 0.5 are removed.

At step S205, a crankangular velocity fluctuation dω(i) is determined removing frequency components of crankangular velocity fluctuations occurring in a frequency of rotational orders of 0.5 and its integral multiples. That is, by determining a deflection of a current crankangular velocity ω(i) from the previous crankangular velocity ω(i−4) (four stroke before) for a specific cylinder, a crankangular velocity fluctuation dω(i), in which crankangular velocity fluctuations occurring in a frequency of rotation orders of 0.5 and its integral multiples are removed, is obtained as shown in FIG. 10. Further, in order to remove components of crankangular velocity fluctuations as noises occur in a frequency band of rotational orders less than 0.5, tempering processing is made by the use of crankangular velocity fluctuations dω(i) obtained for the last eight cycles. The tempered crankangular velocity fluctuation dω(i) is given by the following expression:

dωf(i)=a×dω(i)+b×dω(i−1)+c×dω(i−2)+d×dω(i−3)+e×dω(i−4)+d×dω(i−5)+c×dω(i−6)+b×dω(i−7)+a×dω(i−8)

where a–d are tempering factors.

Figure 11:
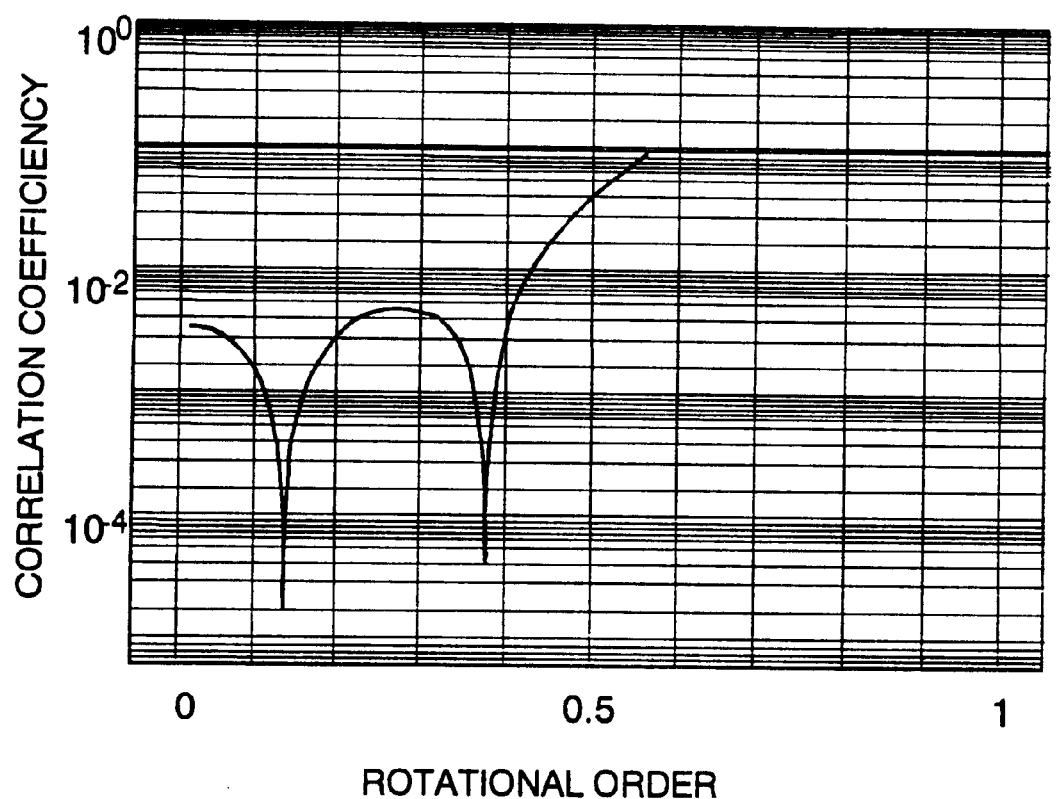
FIG. 11 is a graphical diagram showing crankangular velocity from which frequency components of rotational engine speed of orders lower than 0.5 are removed.

As a result of the tempering processing, as shown in FIG. 11, components of crankangular velocity fluctuations occurring in a frequency band of rotational orders less than 0.5 are satisfactorily removed. In this manner, a crankangular velocity fluctuation dωf(i) of each cylinder on which a combustion state is precisely reflected are obtained.

Subsequently, allowable upper and lower limits of crankangular velocity fluctuation dωfmax and dωfmin on combustion stability are determined with reference to crankangular velocity fluctuation control maps at steps S207 and S208, respectively. These maps specifies upper and lower limits of crankangular velocity fluctuation dωfmax and dωfmin relative to engine speed and air charging efficiency, respectively. The crankangular velocity fluctuation dωf(i) is compared with the upper limit of crankangular velocity fluctuation dωfmax at step S209. When the crankangular velocity fluctuation dωf(i) is greater than the upper limit of crankangular velocity fluctuation dωfmax, a control gain $\theta_{KA}$ (which is greater than 0) for increasing the roughness control variable $\theta_{rgh}(n)$ is determined by the use of control gain map at step S210. The control gain θKA is corrected according to a degree of fuel heaviness at step S211 and employed as a roughness control gain $\theta_K$ at step S212. On the other hand, when the crankangular velocity fluctuation dωf(i) is less than the upper limit of crankangular velocity fluctuation dωfmax, the crankangular velocity fluctuation dωf(i) is then compared with the lower limit of crankangular velocity fluctuation dωfmin at step S213. When the crankangular velocity fluctuation dωf(i) is less than the lower limit of crankangular velocity fluctuation dωfmin, a control gain $\theta_{KR}$ (which is less than 0) for decreasing the roughness control variable $\theta_{rgh}(n)$ is determined by the use of the control gain map at step S214, and employed as a roughness control gain $\theta_K$ at step S212. When the crankangular velocity fluctuation dωf(i) is greater than the lower limit of crankangular velocity fluctuation dωfmin, the roughness control gain $\theta_K$ is adjusted to 0 (zero) at step S216.

Subsequently to determination of the roughness control gain $\theta_K$ at step S212, S215 or S216, a judgement is made at step S217 as to whether the number of a controlled cycle i is greater than eight. When the number of control cycle i is equal to or less than eight, a roughness controlled value $\theta_{rgh}(n)$ is fixed at 0 (zero) at step S218. When the number of control cycle i is greater than eight, another judgement is made at step S219 as to whether the number of control cycle i is equal to or greater than 9 but less than 13. When the number of control cycle i is between 9 and 13, the roughness control gain $\theta_K$ is employed as a roughness control variable $\theta_{rgh}(n)$ at step S220. On the other hand, when the number of control cycle i is greater than 13, a roughness control variable $\theta_{rgh}(n)$ obtained in the last control cycle added by the roughness control gain $\theta_K$ is employed as a roughness control variable $\theta_{rgh}(n)$ at step S221. In this instance, with progress of control cycles, a roughness control variable $\theta_{rgh}(n)$ is suitably provided by an increment of control gain $\theta_K$ for each cylinder. That is, the ignition timing IGT(n) is advanced as a result of varying the roughness control variable $\theta_{rgh}(n)$ try the roughness control gain $\theta_K$ which takes a plus value when the crankangular velocity fluctuation dωf(i) is greater than the upper limit of crankangular velocity fluctuation d ωfmax and is, on the other hand, retarded as a result of varying the roughness control variable $\theta_{rgh}(n)$ by the roughness control gain $\theta_K$ which takes a minus value when the crankangular velocity fluctuation dωf(i) is less than the lower limit of crankangular velocity fluctuation dωfmin.

Figure 12:
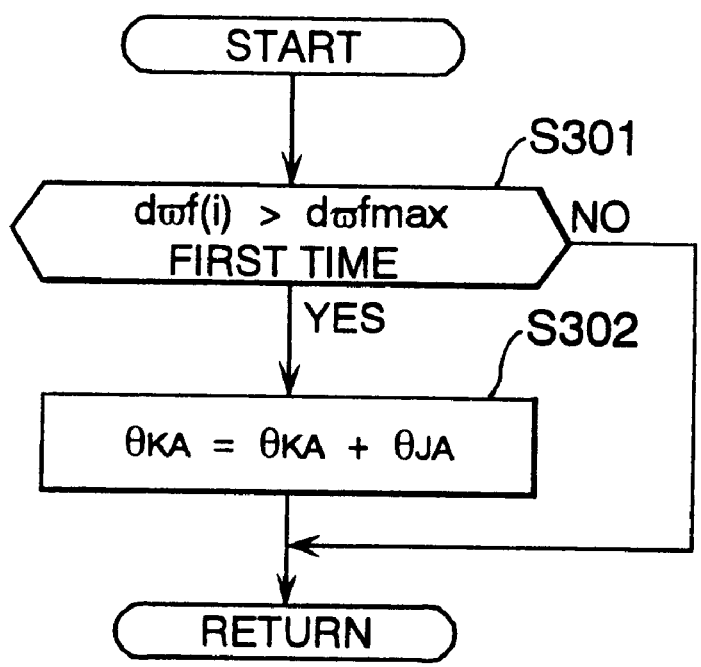
FIG. 12 is a flow chart illustrating a sequence routine of changing roughness control gain according to fuel heaviness.

Subsequently to determination of the roughness control variable $\theta_{rgh}(n)$ at step S218, S220 or S221, a judgement is made at step S222 as to whether the roughness control variable $\theta_{rgh}(n)$ is equal to or greater than an ignition timing advancement limit $\theta_{RMIN}$ which is specified to restrain an advancing correction of ignition timing IGT(n). When the roughness control variable $\theta_{rgh}(n)$ is equal to or greater than the ignition timing advancement limit $\theta_{RMIN}$, after employing the ignition timing advancement limit $\theta_{RMIN}$ as a current roughness control variable $\theta_{rgh}(n)$ at step S223, a flag $F_{RMIN}$ is set up to a state of "1" which indicates that a fluctuation in crankangular velocity is not satisfactorily restrained even by the advancing correction of ignition timing IGT(n) at step S224. On the other hand, when the roughness control variable $\theta_{rgh}(n)$ is less than the ignition timing advancement limit $\theta_{RMIN}$, the flag $F_{RMIN}$ is reset down or cleared at step S225. In this control, an advancing correction of ignition timing IGT(n) is restrained by employing a limit to roughness control variable $\theta_{rgh}(n)$ for restraining a fluctuation in crankangular velocity, so that a rise in catalyst temperature is still effectively accelerated by the retarding control of ignition timing. FIG. 12 is a flow chart illustrating a sequence routing of changing a control gain $\theta_{KA}$ made at step S211 in the roughness control variable $\theta_{rgh}(n)$ determination sequence routine shown in FIGS. 4 and 5.

Figure 13:
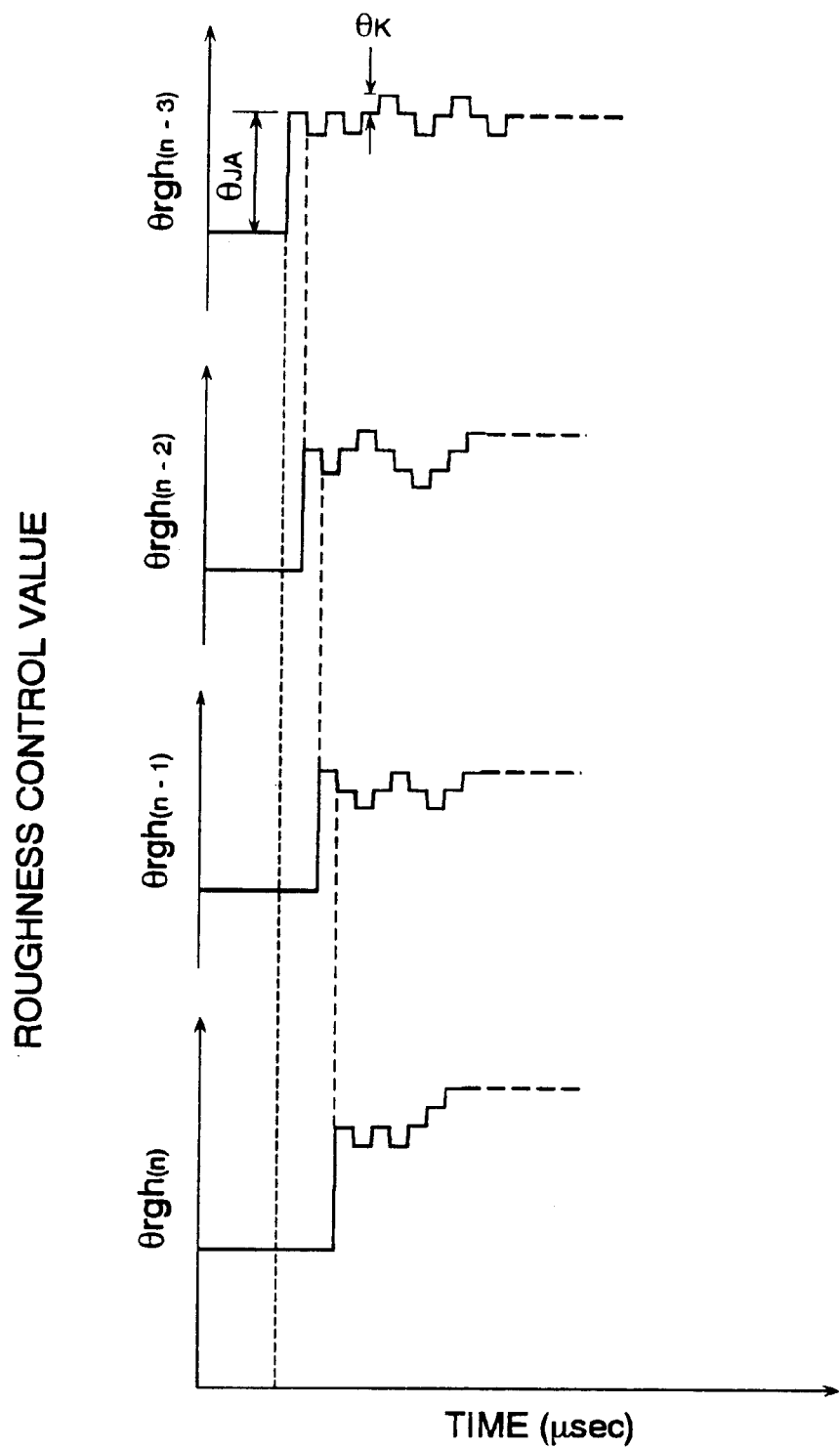
FIG. 13 is an explanatory diagram showing a change in roughness control variable.

As shown, only when the crankangular velocity fluctuation dωf(i) turns greater than the upper limit of crankangular velocity fluctuation dωfmax for the first time at step S301, then, the control gain $\theta_{KA}$ is added by a value $\theta_{JA}$ (which is greater than 0) previously specified according to degree of fuel heaviness at step S302. As a result of which, the roughness control variables $\theta_{rgh}$ for the respective cylinders sharply increase with an effect of quickly advancing the ignition timing IGT as shown in FIG. 13. The control gain $\theta_{KA}$ may be changed to become greater as the crankangular velocity fluctuation dωf(i) increases, as a result of which, an ignition timing is suitably and quickly corrected according to magnifications of the crankangular velocity fluctuation dωf(i), ie. the degree of fuel heaviness.

Figure 14:
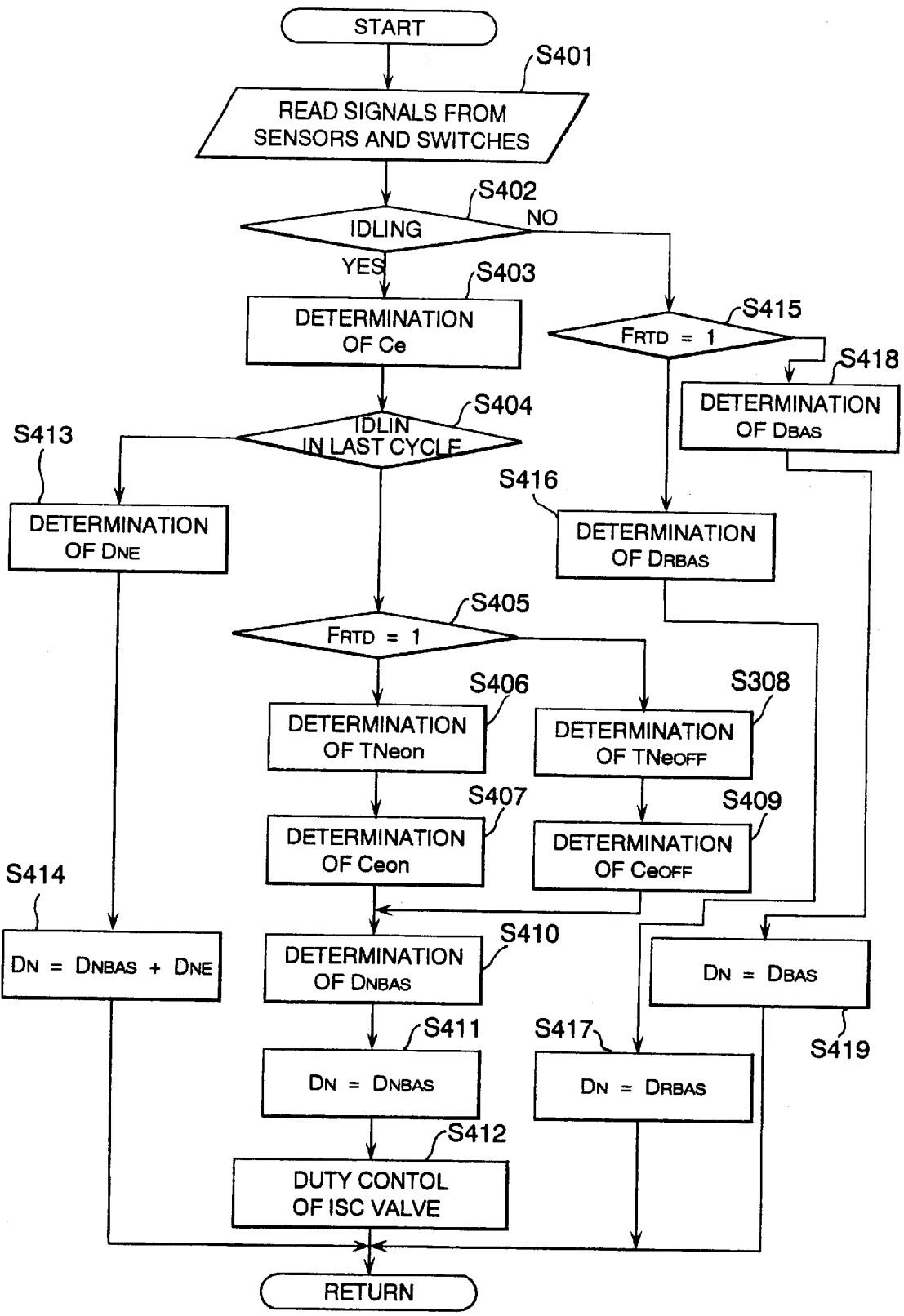
FIG. 14 is a flow chart illustrating a sequence routine of idle speed control.

FIG. 14 is a flow chart which is a sequence routine of the idle speed control performed at the functional block 41 of the ECU 35.

Figure 15:
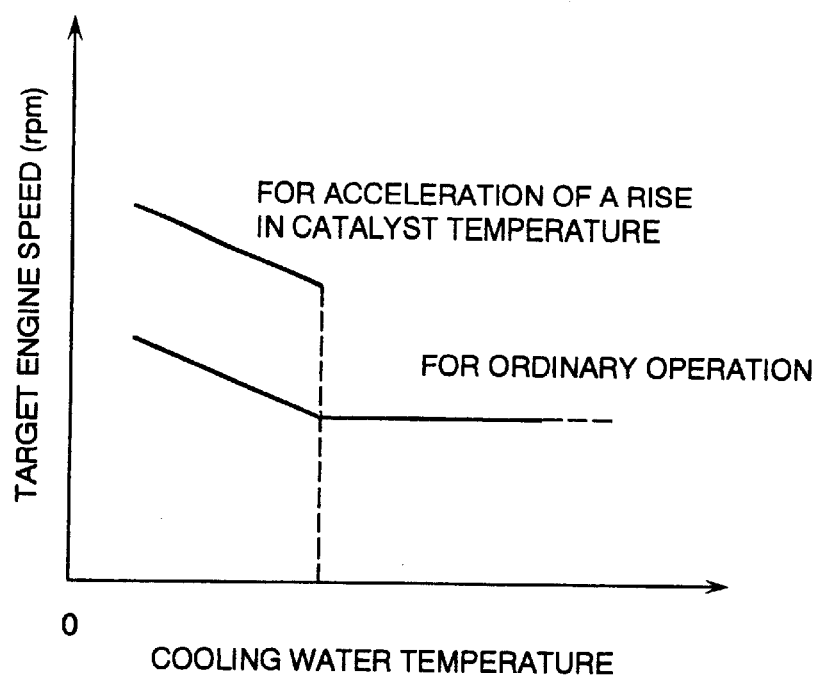
FIG. 15 is an illustration showing a target speed control map.
Figure 16:
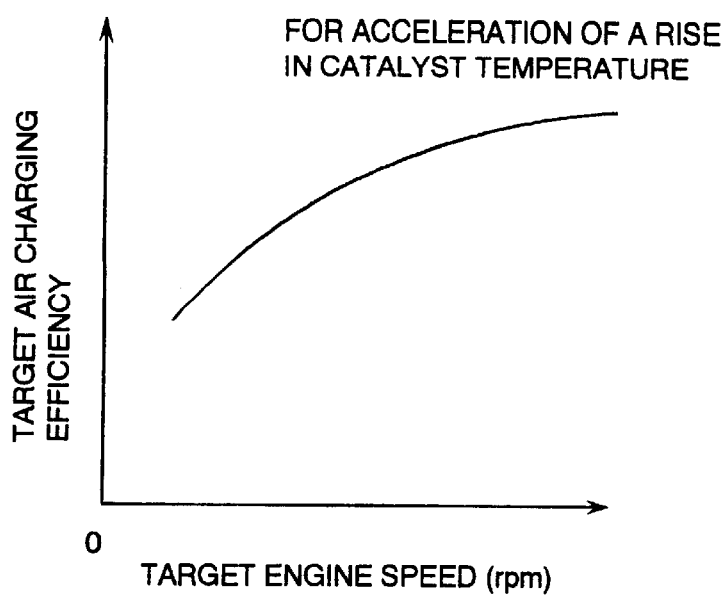
FIG. 16 is an illustration showing a target air charging efficiency control map used during acceleration control of a rise in catalyst temperature.
Figure 17:
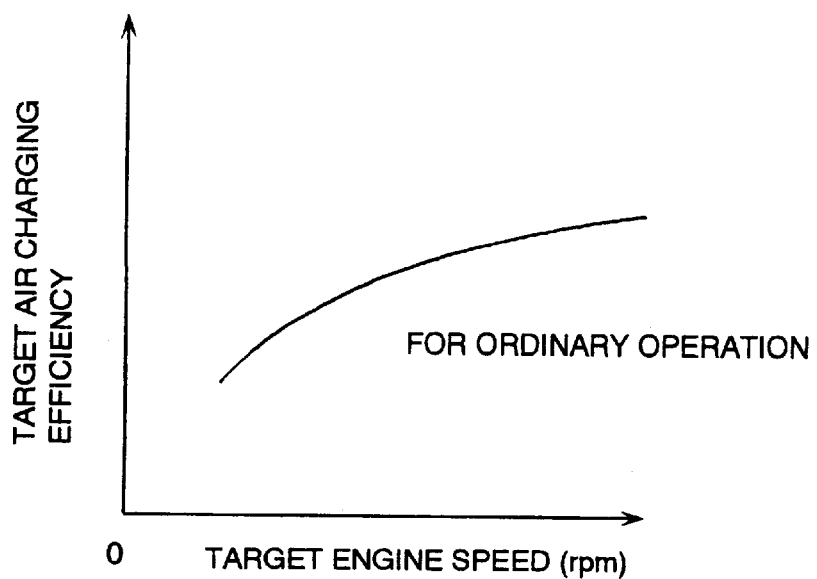
FIG. 17 is an illustration showing a target air charging efficiency control map used during ordinary operation.

When the flow chart logic commences and control proceeds directly to a function block at step S401 where the ECU 35 reads signals from the sensors and switches including at least the air flow sensor 13, the idle switch 22, the crankangle sensor 30, the water temperature sensor 32 and the starter 33. When the engine 1 is currently idling with the throttle valve 14 remaining fully closed at step S402, air charging efficiency Ce is determined based on an air flow rate and an engine speed at step S403. Subsequently, when the engine 1 was not idling during the last control cycle at step S404 and the temperature rising flag FRTD is up at step S405, a target engine speed, i.e. an idle speed TNeon for on-control of the acceleration of catalyst temperature rising (which is hereafter referred to as an on-idling target engine speed), is determined with reference to an idle speed control map (shown in FIG. 15) at step S406, and target air charging efficiency TCeon for on-control of the acceleration of catalyst temperature rising (which is hereafter referred to as an on-idling target air charging efficiency) is determined with reference to a target air charging efficiency control map (shown in FIG. 16) at step S407. On the other hand, when the engine 1 was not idling during the last cycle of control at step S404 but the temperature rising flag FRDT is down at step S405, a target engine speed, i.e. an idle speed TNeoff for off-control of the acceleration of catalyst temperature rising (which is hereafter referred to as an off-idling target engine speed), is determined with reference to the idle speed control map at step S408, and target air charging efficiency TCeoff for off-control of the acceleration of a catalyst temperature rising (which is hereafter referred to as an off-idling target air charging efficiency) is determined with reference to an air charging efficiency control map (shown in FIG. 17) at step S409. The idle speed control map specifies idle speeds TNe relative to engine cooling water temperatures Tcw. As shown in FIG. 15, during cold engine operation at lower cooling water temperature Tcw, the idle speed TNe is relatively high for higher stability of engine operation. Further, in the idle speed control map, an on-idling target engine speed TNeon is higher than an off-idling target engine speed TNeoff for each cooling water temperature Tcw in order for the engine 1 to operate stably and provide an increased thermal energy of exhaust gas with an effect of accelerating a rise in catalyst temperature while an ignition timing is retarded. Each air charging efficiency map specifies experimental target air charging efficiency TCe relative to target idle speeds TNe. On-control target air charging efficiency TCeon is higher than off-control target air charging efficiency TCeoff for each cooling water temperature Tcw. That is, because, while an ignition timing is retarded by execution of the control of acceleration of catalyst temperature rising, a proportion of the thermal energy generated by fuel combustion which is converted into rotation of the crankshaft is lowered and the engine 1 consequently drops its output power, the target air charging efficiency TCeon is increased to compensate the drop in engine output power so as to provide improved combustion stability.

Figure 18:
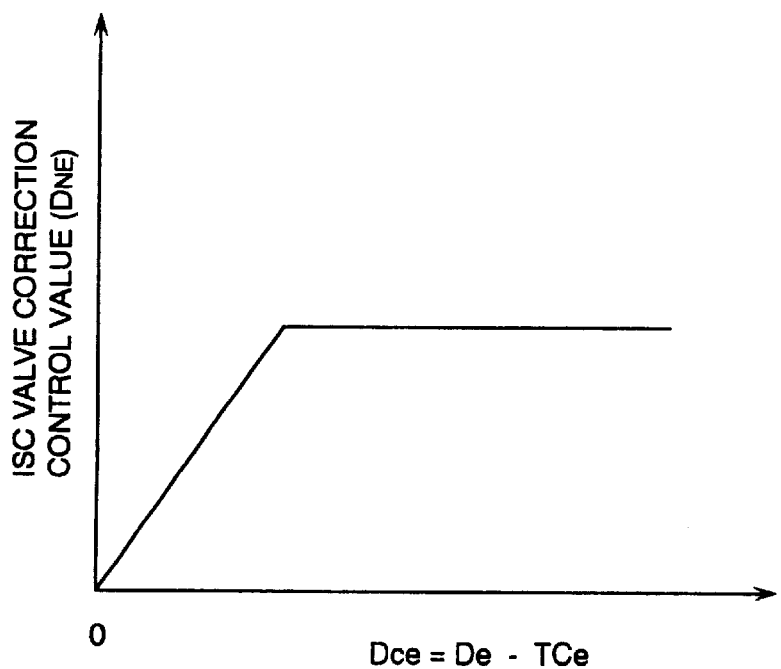
FIG. 18 is an illustration showing an idle valve control map.

After the determination of those on-control target air charging efficiency TCeon at step S407 or the off-control target air charging efficiency TCeoff at step S409, a basic value of idle speed control DNBAS meeting an opening of the idle speed control valve 21 necessary to deliver the on-control target air charging efficiency TCeon or the off-control target air charging efficiency TCeoff is determined with reference to an idle speed control map at step S410. The idle speed control map specifies openings of the idle speed control valve 21 relative to target air charging efficiencies TCe. Subsequently, at step S411, the basic value of idle speed control DNBAS is employed as a practical value of idle speed control DN at step S411. When the engine 1 was idling during the last control cycle at step S404, after determining a correction value of idle speed control DNE according to a deflection DCe of current air charging efficiency Ce from the target air charging efficiency TCe with reference to an idle speed correction map (shown in FIG. 18) at step S413, a practical value of idle speed control DN is determined by adding the correction value of idle speed control DNE to the basic value of idle speed control DNBAS at step S414. As shown in FIG. 18, the idle speed correction map specifies correction values of idle speed control DNE relative to air charging efficiency deflections DCe. The correction value of idle speed control DNE is linearly increased with an increase in air charging efficiency deflection DCe in a range of lower air charging efficiency deflections DCe and however fixed for larger air charging efficiency deflection DCe.

Further, when the engine 1 is currently not idling at step S402 and the temperature rising flag FRDT is up at step S415, a basic value of idle speed control DNBAS meeting an opening of the idle speed control valve 21 necessary to deliver the on-control target air charging efficiency TCeon is determined with reference to the idle speed control map at step S416, and is, subsequently, employed as a practical value of idle speed control DN at step S417. On the other hand, when, while the engine 1 is currently not idling at step S402, the temperature rising flag FRDT is (lown at step S415, a basic value of idle speed control DNBAS meeting an opening of the idle speed control valve 21 necessary to deliver the off-control target air charging efficiency TCeoff is determined with reference to the idle speed control map at step S418, and is, subsequently, employed as a practical value of idle speed control DN at step S419.

Figure 19:
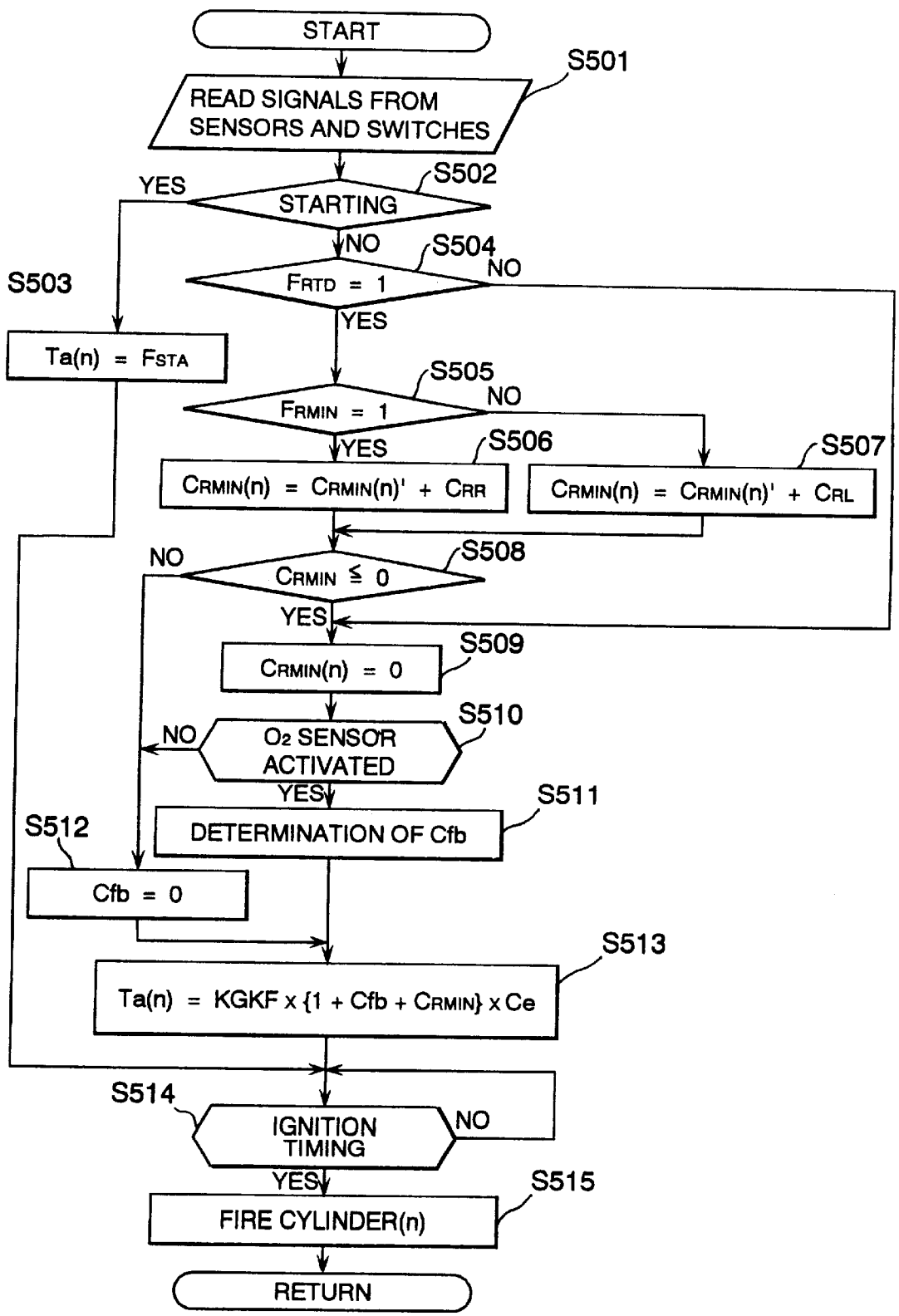
FIG. 19 is a flow chart illustrating a sequence routine of fuel injection control.

Finally, after the determination of a practical value of idle speed control DN at step S401, S414, S417 or S419, the idle speed control valve 21 is controlled at a duty ratio corresponding to the value of idle speed control DN at step S412. The flow chart logic then orders return for another cycle of the sequence routine. FIG. 19 is a flow chart illustrating a sequence routine of the fuel injection control performed at function block 40 of the ECU 35.

As shown, when the flow chart logic commences and control proceeds directly to a function block at step S501 where the ECU 35 reads signals from the sensors and switches including at least the air flow sensor 13, the O2 sensor 26, the crankangle sensor 30 and the starter switch 33. Subsequently, a judgement is made at step S502 as to whether the engine 1 has been started. The engine 1 is judged to have been started when there is a signal from the starter switch 33 and an engine speed Ne less than a specified speed is detected. When the engine has been started, an injector pulse width Ta(n) is fixed at an starting pulse width TSTA for a cylinder(n) at step S503. The starting pulse width TSTA is previously determined such that an air/fuel mixture is enriched sufficiently to provide desired startability. On the other hand, when there is no signal from the starter switch 33 or when the engine 1 is operating at a speed higher than the specified speed, the engine 1 is judged to be during a start, then judgements are made as to whether the temperature rising flag FRTD has been up at step S504 and whether an ignition timing correction flag FRMIN has been up at step S505. The ignition timing correction flag FRMIN set up to a state of "1" indicates that a crankangular velocity fluctuation is restrained by the correction control of an ignition timing made at function block 39 of the ECU 35. When both flags FRTD and FRMIN are up, then, at step S506, an enriching value of fuel injection CRMIN(n) is determined by adding a control gain CRR to a previous enriching value of fuel injection CRMIN'(n). On the other hand, when, while the temperature rising flag FRTD is up, the ignition timing correction flag FRMIN is down, then, at step S507, an enriching value of fuel injection CRMIN(n) is determined by subtracting the control gain CRR from the previous enriching value of fuel injection CRMIN'(n). That is, if the crankangular velocity fluctuation is not restrained even by the correction control of an ignition timing made at function block 39 of the ECU 35, an air/fuel mixture is enriched to prevent aggravation of combustion stability beyond limits.

After the determination of an enriching value of fuel injection CRMIN(n) at step S506 or S507, a judgement is made at step S508 as to whether the enriching value of fuel injection CRMIN(n) is equal to or less than 0 (zero). When, while the temperature rising flag FRTD is up, the enriching value of fuel injection CRMIN(n) is equal to or less than 0 (zero) or when the temperature rising flag FRTD is down, the enriching value of fuel injection CRMIN(n) is fixed at 0 (zero) at step S509. Subsequently, when the O2 sensor 26 has been suitably activated at step S510, a (correction value Cfb(i) for air/fuel ratio feedback control based on an output signal from the O2 sensor 26 toward a stoichiometric air/fuel ratio is determined at step S511. On the other hand, when the enriching value of fuel injection CRMIN(n) is greater than 0 (zero) at step S508 or when, while the enriching value of fuel injection CRMIN(n) is equal to or less than 0 (zero), the O2 sensor 26 has not yet suitably been activated at step S510, a correction value Cfb(i) for the air/fuel ratio feedback control is fixed at 0 (zero) at step S512.

After the determination of a feedback control correction value Cfb(i) at step S511 or S512, An injector pulse width Ta(n) is determined by the following expression:

$$Ta(n) = KGKF \times \{1 + Cfb(i) + CRMIN(n)\} \times Ce$$

where KGKF is the injector flow rate coefficient.

Subsequently to the determination of an injector pulse width Ta(n) at step S503 or S513, after waiting a fuel injection timing, at step S514, an injector pulse having the pulse width Ta(n) is provided to actuate the injector 16 for a cylinder (n) to spray fuel at step S515.

As described above, when the enriching value of fuel injection CRMIN(n) take a plus valve, the air/fuel ratio feedback control based on an output signal from the O2 sensor 26 is interrupted and an air/fuel mixture is enriched by providing an increased injector pulse width Ta(n). On the other hand, when the enriching value of fuel injection CRMIN(n) take a minus valve, the air/fuel ratio feedback control based on an output signal from the O2 sensor 26 is performed on condition that the O2 sensor 26 has been suitably activated. In other words, while an air/fuel ratio is feedback controlled toward a stoichiometric air/fuel ratio, it is corrected to deliver an air/fuel mixture richer than a stoichiometric mixture only if there is a possibility of aggravation of combustion stability.

Figure 20:
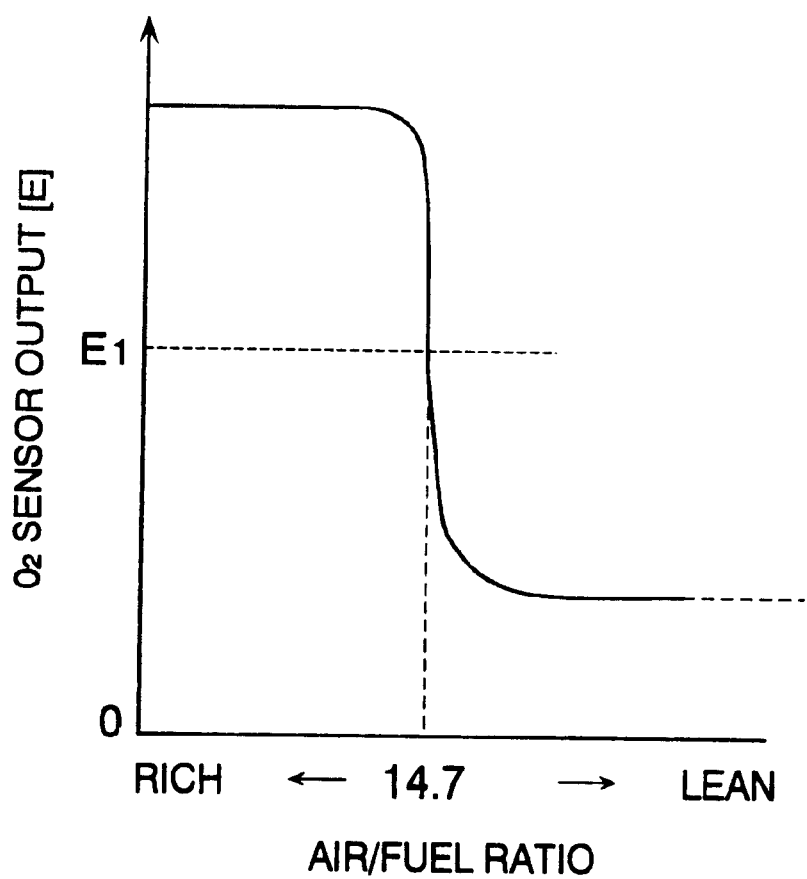
FIG. 20 is a graphical diagram showing output characteristic of an oxygen sensor.

FIG. 20 shows an output characteristic of the O2 sensor 26.

As shown, an electromotive force shows a normal level E1 when the oxygen concentration in exhaust gas corresponds to a stoichiometric air/fuel ratio and sharply rises or drops when an air/fuel mixture becomes richer or leaner than the stoichiometric mixture, respectively.

Figure 21:
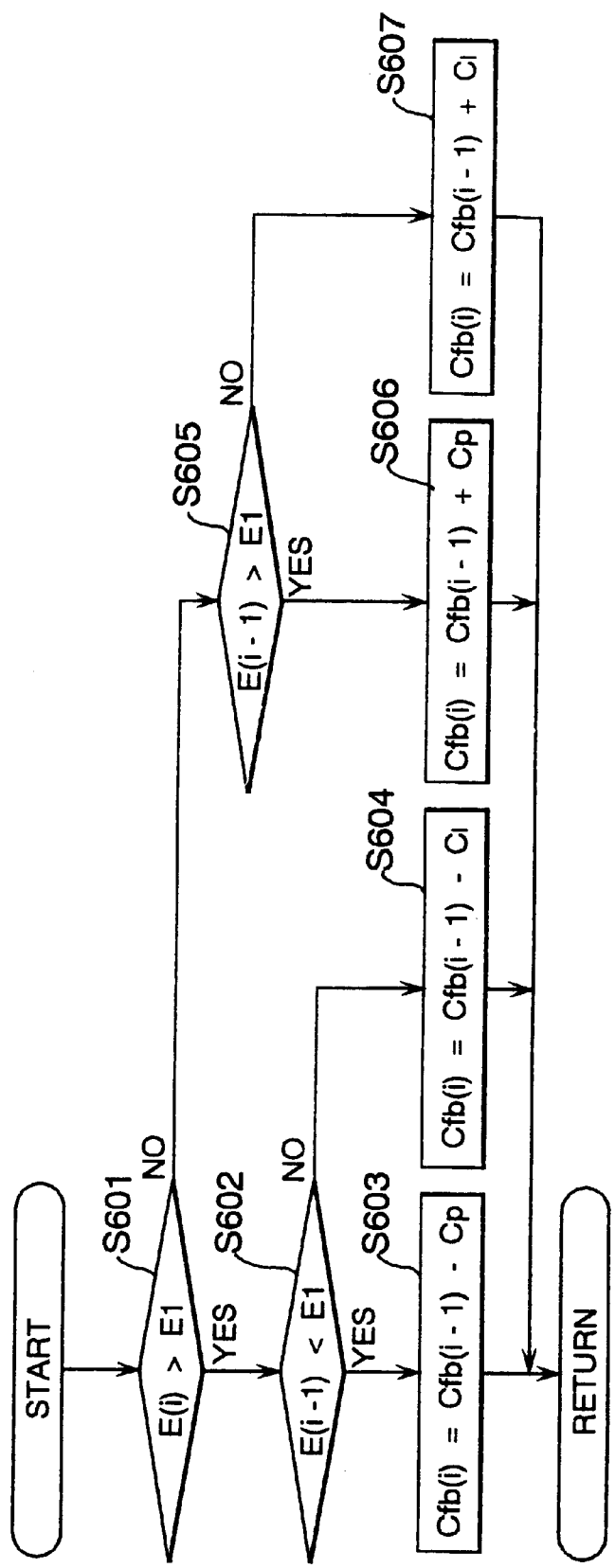
FIG. 21 is a flow chart illustrating a sequence routine of determining an air/fuel feedback correction value.

FIG. 21 is a flow chart illustrating a sequence routine of the determination of air/fuel ratio feedback control correction value Cfb(i) made at step S511.

As shown, when the flow chart logic commences and control proceeds directly to a judgement at step S601 where a current output level E(i) of the O2 sensor 26 is compared with the normal level E1. When the current output level E(i) is higher than the normal level E1, an previous output level E(i-1) during the last cycle is compared with the normal level E1 at step S602. When the previous output level E(i-1) is equal to or lower than the normal level E1, an air/fuel ratio feedback control correction value Cfb(i) is determined by subtracting a relatively large control gain CP from a previous air/fuel ratio feedback control correction value Cfb(i-1) at step S603. On the other hand, when the previous output level E(i-1) is higher than the normal level E1, an air/fuel ratio feedback control correction value Cfb(i) is determined by subtracting a relatively small control gain CI to the previous air/fuel ratio feedback control correction value Cfb(i-1) at step S604.

When the current output level E(i) is equal to or lower than the normal level E1, the previous output level E(i-1) is compared with the normal level E1 at step S605. When the previous output level E(i-1) is higher than the normal level E1, an air/fuel ratio feedback control correction value Cfb(i) is determined by adding the large control gain CP to a previous air/fuel ratio feedback control correction value Cfb(i-1) at step S606. On the other hand, when the previous output level E(i-1) is equal to or less than the normal level E1, an air/fuel ratio feedback control correction value Cfb(i) is determined by adding the small control gain CI to the previous air/fuel ratio feedback control correction value Cfb(i-1) at step S607.

Figure 22:
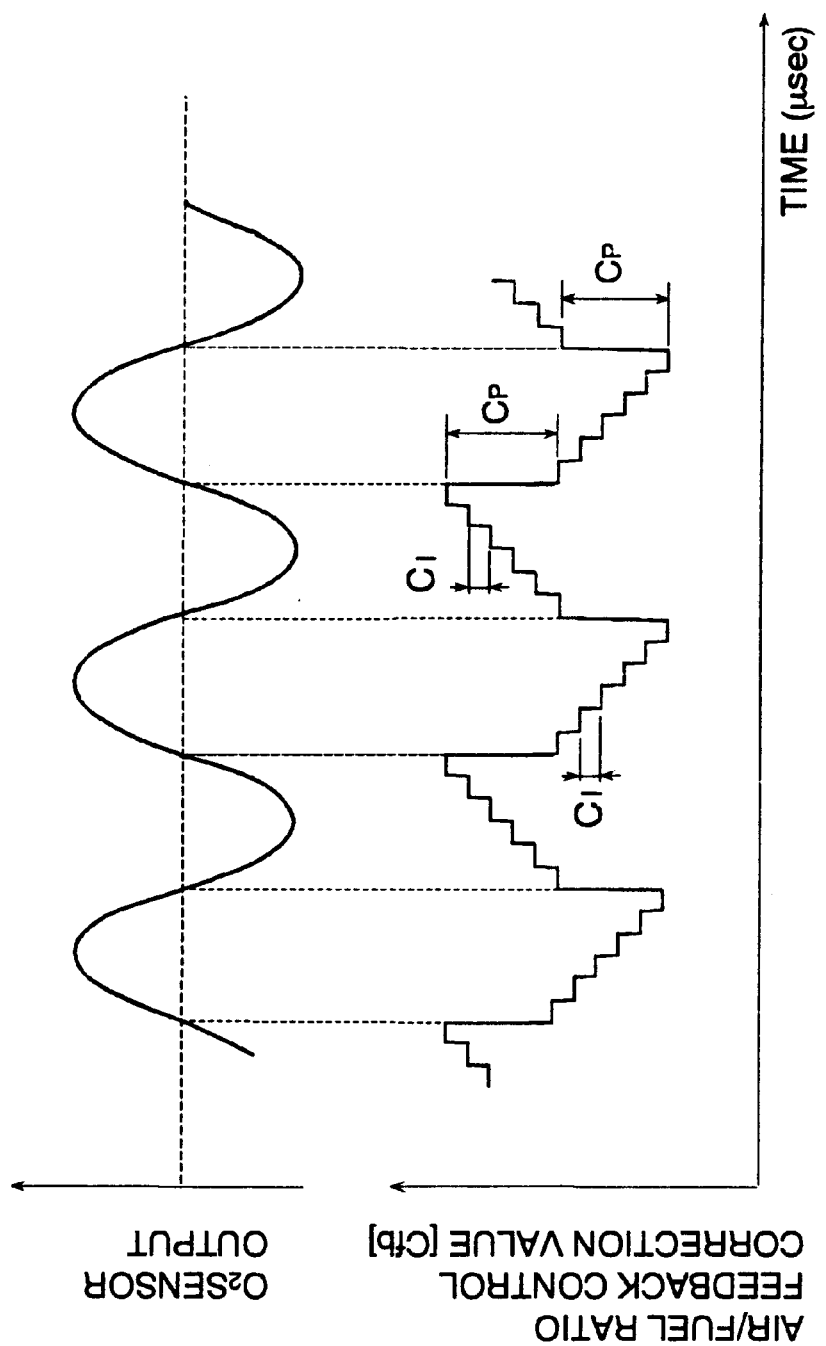
FIG. 22 is an explanatory diagram showing the relationship between air/fuel feedback correction value and output of the oxygen sensor.

As shown in FIG. 22, during; a period in which an output level E(i) of the O2 sensor 26 is higher than the normal level E1, the air/fuel ratio feedback control correction value Cfb(i) is changed by a decrement of the control gain CP or CI every control cycle to reduce an injector pulse width Ta(n), so as to decrease the fuel injection quantity and thereby to bring an air/fuel mixture more lean. As a result, the output level E(i) of the O2 sensor 26 drops gradually toward the normal level E1. On the other hand, when an output level E(i) of the O2 sensor 26 reverses between opposite sides of the normal level E1 due, for example, to a change in air/fuel ratio above the stoichiometric air/fuel ratio or a change in air/fuel ratio below the stoichionietric air/fuel ratio, the air/fuel ratio feedback control correction value Cfb(i) is sharply changed by subtracting the large control gain CP. On the other hand, an output level E(i) of the O2 sensor 26 remains on either side of the normal level E1, the air/fuel ratio feedback control correction value Cfb(i) is gradually changed by subtracting the small control gain CP.

When an output level E(i) of the O2 sensor 26 is lower than the normal level E1, the air/fuel ratio feedback control correction value Cfb(i) is changed by an increment of the control gain CP or CI every contrcl cycle to increase an injector pulse width Ta(n), so as to increase the fuel injection quantity and thereby to bring an air/fuel mixture more rich. As a result, the output level E(i) of the O2 sensor 26 rises gradually toward the normal level E1. Further, when an output level E(i) of the O2 sensor 26 reverses between opposite sides of the normal level E1, the air/fuel ratio feedback control correction value Cfb is sharply changed by adding the large control gain CP. On the other hand, an output level E(i) of the $O_2$ sensor 26 remains on either side of the normal level E1, the air/fuel ratio feedback control correction value Cfb is gradually changed by adding the small control gain CP. Because a fuel injection quantity is feedback controlled based on an output level of the O2 sensor 26, an air/fuel ratio of an air/fuel mixture reverses between opposite sides, namely a richer side and a leaner side, of the stoichiometric air/fuel ratio, as a result of which, the catalyst converter is caused to show effectively its conversion efficiency.

Figure 23:
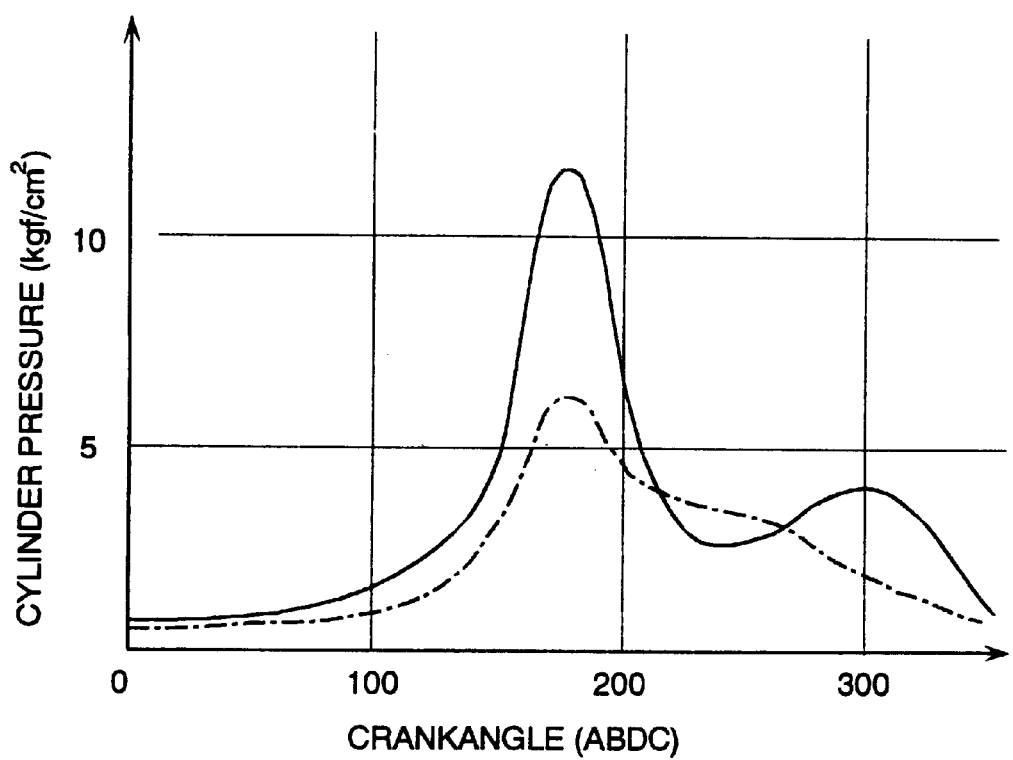
FIG. 23 is a graphical diagram showing a change in cylinder pressure according to retarded crankangles.

As described above, when it is detected based on a temperature of engine cooling water and a time passed from an engine start that the catalyst is not yet warmed up sufficiently, an ignition timing IGT(n) is retained to rise the temperature of exhaust gas so as to accelerate a rise in catalyst temperature. As seen in FIG. 23 showing cylinder pressure relative to crankangle after bottom dead center in a suction stroke when a stoichiometric mixture is burnt, when retarding the ignition timing IGT(n) greatly to a crankangle of, for example, 20° ATDC, a peak of combustion of an air/fuel mixture occurs after a considerable drop in cylinder pressure after a middle stage of an expansion stroke as shown by a solid line and, consequently, conversion efficiency of the thermal energy of combustion is considerably low. As a result, The temperature of exhaust gas rises greatly due to a considerably increased exhaust loss. In FIG. 23, cylinder pressure produced when an air/fuel mixture is fired at an ignition timing right at TDC is shown by a dotted line for comparison purpose.

Figures 24A, 24B:
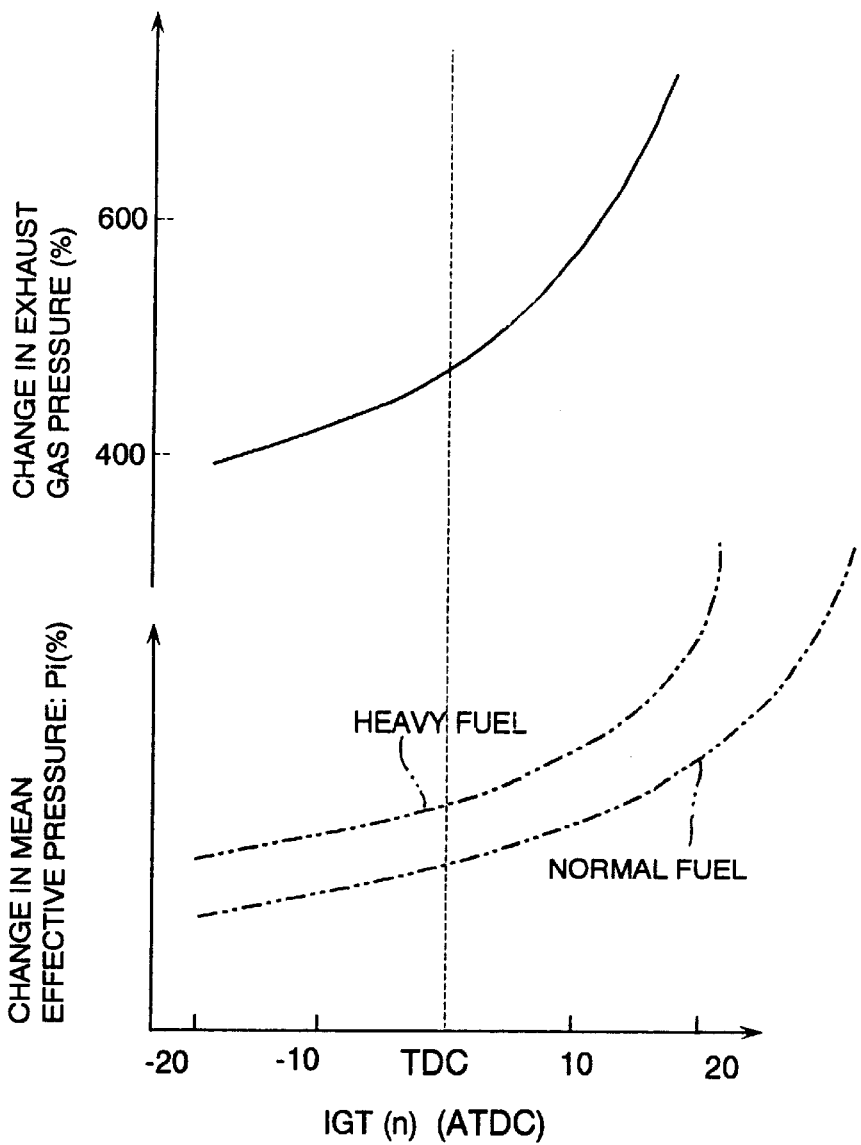
FIG. 24A is a graphical diagram showing a change in exhaust gas temperature relative to ignition timing.
FIG. 24B is a graphical diagram showing changes in mean effective pressure for heavy fuel and normal fuel relative to ignition timing.

FIG. 24A shows exhaust gas temperature relative to ignition timing IGT(n). As proved in FIG. 24A, the exhaust gas temperature rises higher as an ignition timing IGT(n) is retarded, so as to rise early a catalyst temperature. However, as shown in FIG. 24B, a retard in ignition timing IGT(n) yields an increase in changing rate (%) of mean effective pressure Pi, i.e. a torque changing rate, as a result of which, there occurs aggravation of combustion stability. In particular, the changing rate of mean effective pressure Pi is higher for a heavy fuel than for a normal Fuel. Accordingly, a heavy fuel possibly occurs aggravation of combustion stability. However. in the fuel combustion control system according to the above embodiment of the invention, since the ignition timing IGT(n) is advanced based on a crankangular velocity fluctuation dωf(i), a state of actual combustion is monitored based on the crankangular velocity fluctuation dωf(i). Accordingly, the engine 1 is controlled to operate always within limits on combustion stability. Even during a cold engine start, acceleration of a rise in catalyst temperature is guaranteed as well as combustion stability. Even if ignitability and combustibility of a fuel is changed due to deterioration, the above described effects are realized in its own quality. Further, while the engine 1 is idling, the air charging efficiency is increased by idle speed control and the engine 1 is controlled to operate at a speed higher than an intended idle speed, as a result of which, combustion stability is secured as well as acceleration of a rise in catalyst temperature.

Figure 25:
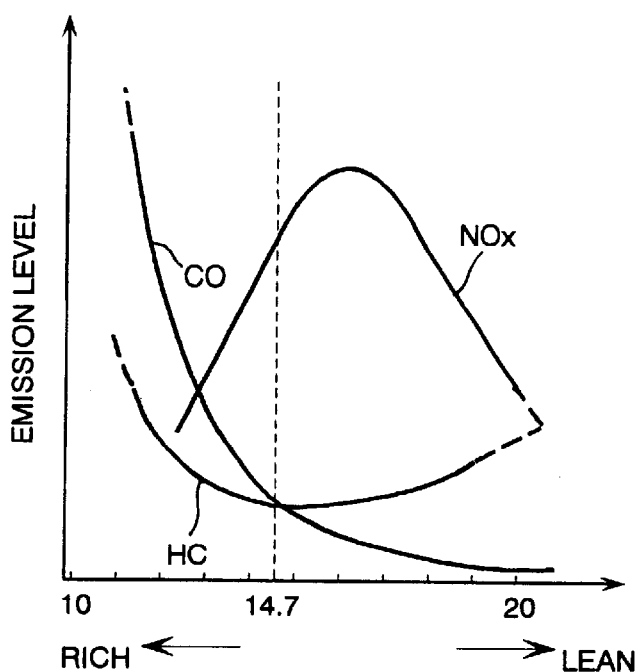
FIG. 25 is a graphical diagram showing changes in emission level relative to air/fuel ratio.
Figure 26:
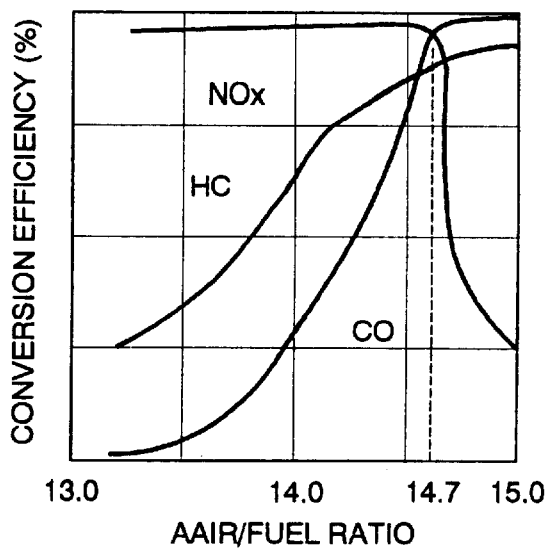
FIG. 26 is a graphical diagram showing changes in catalytic conversion efficiency relative to air/fuel ratio.
Figures 27A, 27B:
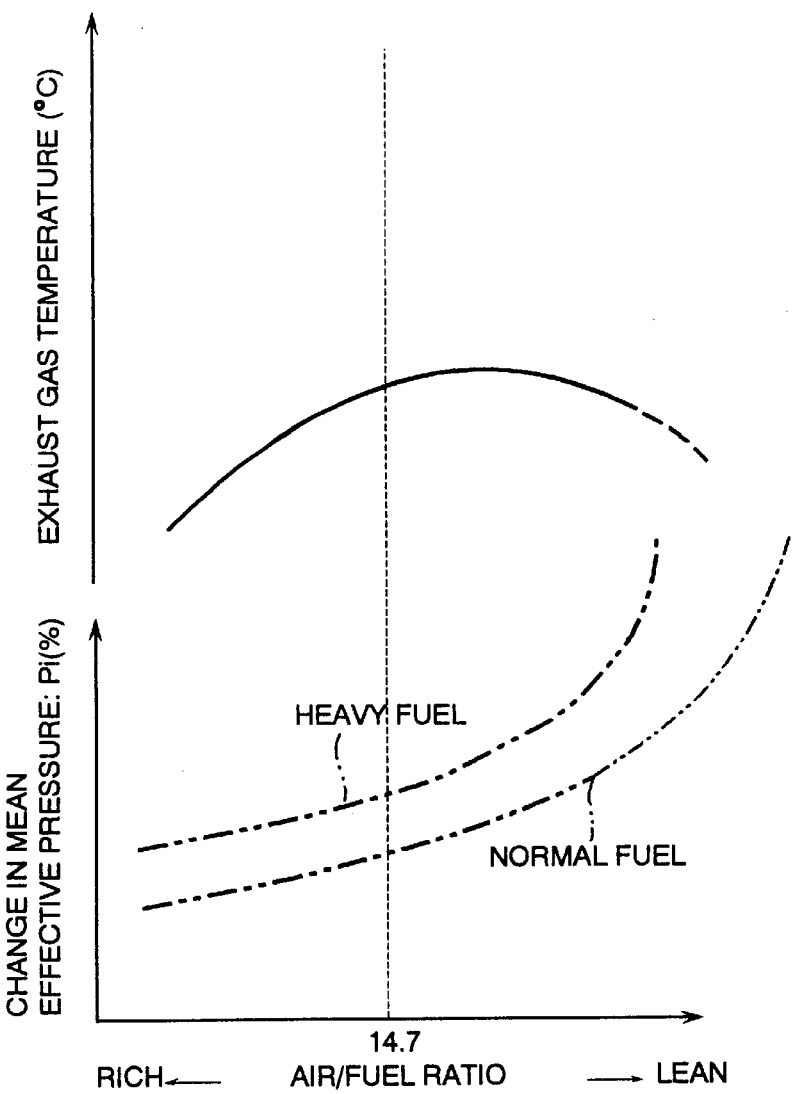
FIG. 27A is a graphical diagram showing a change in exhaust gas temperature relative to air/fuel ratio.
FIG. 27B is a graphical diagram showing changes in means effective pressure for heavy fuel and normal fuel relative to air/fuel ratio.

Further, during execution of acceleration of a rise in catalyst temperature by retarding the ignition timing IGT(n), the air/fuel ratio feedback control is executed to deliver a stoichiometric air/fuel ratio. As a result, as shown in FIG. 25, The emission levels of hydrocarbons (HC) and carbon monoxide (CO) are significantly lowered. The emission level of nitrogen oxides (NOx) is relatively lowered. As shown in FIG. 26, the catalytic conversion efficiency for these emissions are considerably high for air/fuel ratios close to a stoichiometric air/fuel ratio (14.7). Accordingly, catalysts installed in the exhaust line do an excellent job of reducing harmful emissions with a rise in catalyst temperature. As shown in FIG. 27A, the exhaust gas temperature rises relatively higher at a stoichiometric air/fuel ratio (14.7) with an effect of rising the catalyst temperature. Furthermore, in the case where, while the air/fuel ratio feedback control is performed to deliver a stoichiometric air/fuel ratio, it is hard to restrain fluctuations of crankangular velocity sufficiently even by the ignition timing correction control and the idle speed control, a correction is made to change an air/fuel ratio to a smaller side to strive for combustion stability. That is, as shown in FIG. 27B, a change in air/fuel ratio toward a rich side yields a decrease in changing rate (%) of mean effective pressure Pi, i.e. a torque changing rate, as a result of which, combustion stability is improved. Even in the case, for example, where a fuel of inferior ignitability and combustibility is used, the engine 1 is controlled to operate always within limits on combustion stability with an effect of preventing harmful emissions from sharply increasing as well as preventing an occurrence of enhanced vibrations.

Figure 28:
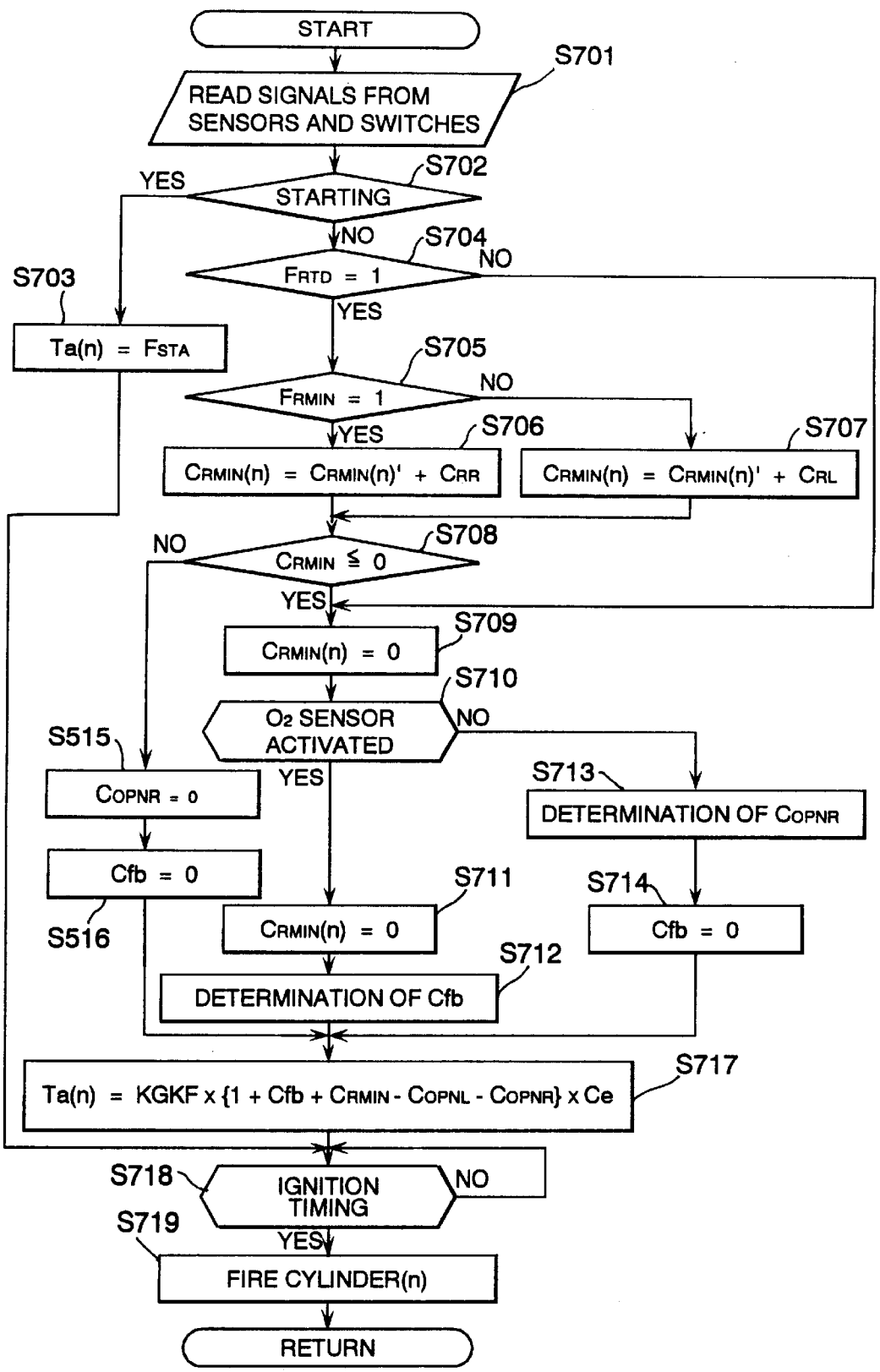
FIG. 28 is a flow chart illustrating a sequence routine of fuel injection control in accordance with another embodiment of the invention.

FIG. 28 is a flow chart illustrating a variation of the sequence routine of the fuel injection control shown in FIG. 19. In the fuel injection control, until the O2 sensor 26 is warmed by exhaust gas and sufficiently activated to a normal condition immediately after a cold engine start, an air/fuel ratio is controlled to shift to a rich side so as thereby to stabilizing combustion.

As shown, when the flow chart logic commences and control proceeds directly to a function block at step S701 where the ECU 35 reads signals from the sensors and switches including at least the air flow sensor 13, the O2 sensor 26, the crankangle sensor 30 and the starter switch 33. Subsequently, a judgement is made at step S702 as to whether the engine 1 has been started. When the engine has been started, an injector pulse width Ta(n) is fixed at an starting pulse width TSTA for a cylinder(n) at step S703. On the other hand, when there is no signal from the started switch 33 or when the engine 1 is operating at a speed higher than the specified speed, the engine 1 is judged to be during a start, then judgements are made as to whether the temperature rising flag FRTD has been up at step S704 and whether an ignition timing correction flag FRMIN has been up at step S705. When both flags FRTD and FRMIN are up, then, at step S706, an enriching quantity of fuel injection CRMIN(n) is determined by adding a control gain CRR to a previous enriching quantity of fuel injection CRMIN'(n). On the other hand, when, while the temperature rising flag FRTD is up, the ignition timing correction flag FRMIN is down, then, at step S707, an enriching quantity of fuel injection CRMIN(n) is determined by subtracting the control gain CRR from the previous enriching quantity of fuel injection CRMIN'(n). After the determination of an enriching quantity of fuel injection CRMIN(n) at step S706 or S707, a judgement is made at step S708 as to whether the enriching quantity of fuel injection CRMIN(n) is equal to or less than 0 (zero). When, while the temperature rising flag FRTD is up, the enriching quantity of fuel injection CRMIN(n) is equal to or less than 0 (zero) or when the temperature rising flag FRTD is down, the enriching quantity of fuel injection CRMIN(n) is fixed at 0 (zero) at step S709. Subsequently, when the O2 sensor 26 has been suitably activated at step S710, after fixing an enriching correction value CROPN(n) for feedforward fuel injection control (which is hereafter referred to as an open control enriching correction value) to 0 (zero) at step S711, an air/fuel ratio feedback control correction value Cfb(i) is determined at step S712. On the other hand, when the O2 sensor 26 has not yet been activated at step S710, an open control enriching correction value CROPN(n) is determined at step S713, and an air/fuel ratio feedback control correction value Cfb(i) is fixed at 0 (zero) at step S714.

When the enriching quantity of fuel injection CRMIN(n) is greater than 0 (zero) at step S708, an open control enriching correction value CROPN(n) is fixed at 0 (zero) at step S715, and an air/fuel ratio feedback control correction value Cfb(i) is fixed at 0 (zero) at step S716.

After the determination of an air/fuel ratio feedback control correction value Cfb(i) at step S712, S714 or S716, an injector pulse width Ta(n) is determined by the following expression at step S717:

$$Ta(n)=KGKF\times\{1+Cfb(i)+C_{RMIN}(n)+C_{ROPN}(n)\}\times Ce$$

Subsequently to the determination of an injector pulse width Ta(n) at step S703 or S717, after waiting a fuel injection timing at step S718, an injector pulse having the pulse width Ta(n) is provided to actuate the injector 16 for a cylinder (n) to spray fuel at step S719.

As described above, before activation of the O2 sensor 26, a fuel injection quantity is feedforward controlled to shift an air/fuel ratio to a smaller side less than a stoichiometric air/fuel ratio (14.7) with an effect of preventing aggravation of fuel vaporization and improving combustion stability. During execution of the feedforward control of air/fuel ratio, combustion stability is secured by the air/fuel ratio control, so that an ignition timing may be greatly retarded to give acceleration of a rise in catalyst temperature priority.

Figure 29:
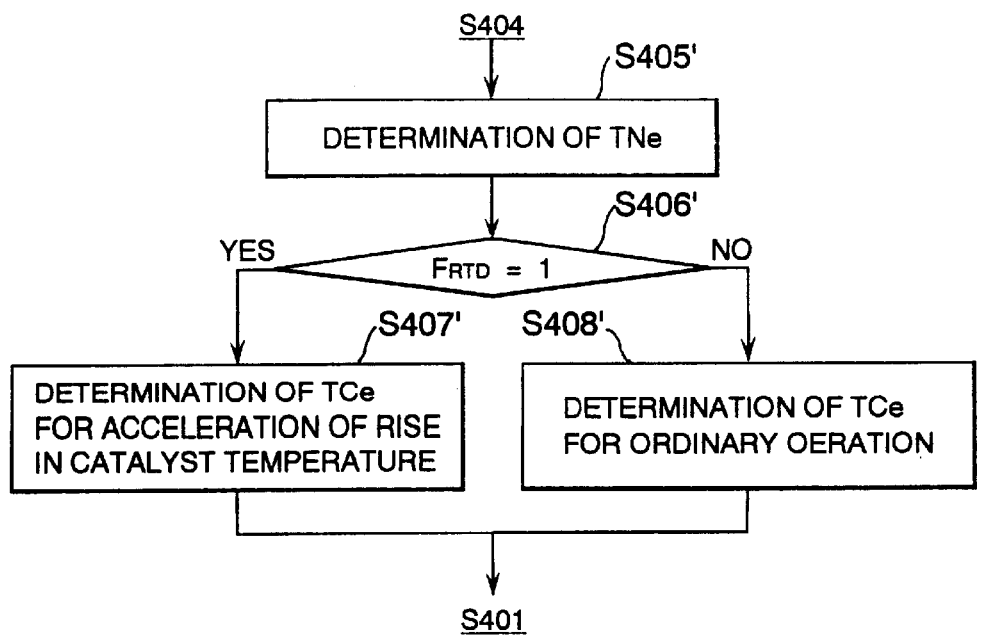
FIG. 29 is a flow chart partly illustrating a sequence routine of idle speed control.

While the idle speed control may be performed by the sequence routine shown in FIG. 14, however, during execution of the retarding control of ignition timing, it is not always necessary to rise an engine speed but may maintain an idle speed as shown in FIG. 29 in which a part different from the sequence routine shown in FIG. 14 is illustrated.

Figure 30:
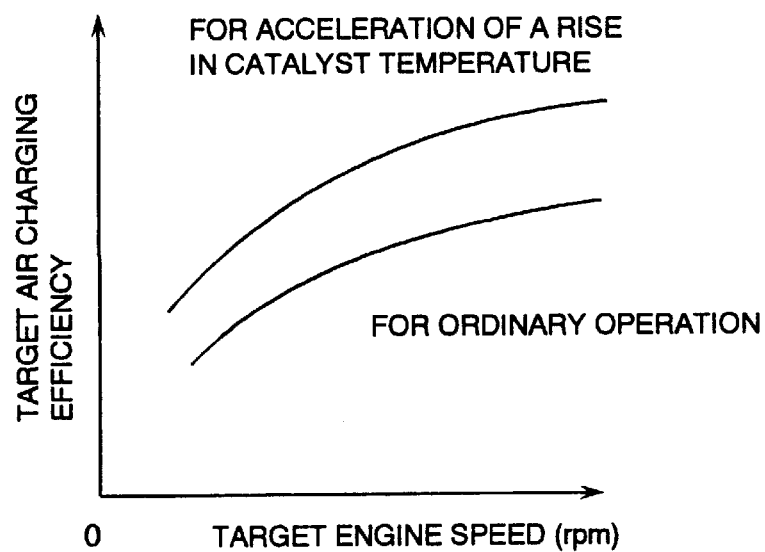
FIG. 30 is an illustration showing a target air charging efficiency control mal.

Specifically, when the engine 1. was not idling during the last control cycle at step S404, a target engine speed TNe is determined as an idle speed based on cooling water temperature with reference to an idle speed control map at step S405'. The idle speed control map specifies engine speeds relative to cooling water temperatures. When the temperature rising flag F$_{RTD}$ is up at step S406', an on-idling target air charging efficiency TCeon is determined with reference to a target air charging efficiency control map at step S407'. On the other hand, when the temperature rising flag F$_{RTD}$ is down at step S406', an off-idling target air charging efficiency TCeoff is determined with reference to the target air charging efficiency control map at step S408'. As shown in FIG. 30, the target air charging efficiency control map defines on-idling target air charging efficiency TCeon and off-idling target air charging efficiency TCeoff relative to target engine speeds TNe such that the on-idling target air charging efficiency TCeon is higher than the off-idling target air charging efficiency TCeoff over a full range of target engine speeds. The utilization of the target air charging efficiency control map makes it possible to complement a drop in engine output torque so as thereby to keep a target engine speed TNe.

After the determination of the on-control target air charging efficiency TCeon at step S407'or the off-control target air charging efficiency TCeoff at step S408, a basic value of idle speed control D$_{NBAS}$ meeting, an opening of the idle speed control valve 21 necessary to deliver the on-control target air charging efficiency TCeon or the off-control target air charging efficiency TCeoff is determined with reference to an idle speed control map at step S410 as shown in FIG. 14.

The ECU 35 may include a functional block 50 (see FIG. 2) for performing swirl valve control. In the embodiment, the swirl valve 18 is closed during cold engine operation to enhance an intake air stream to the combustion chamber 6.

Figure 31:
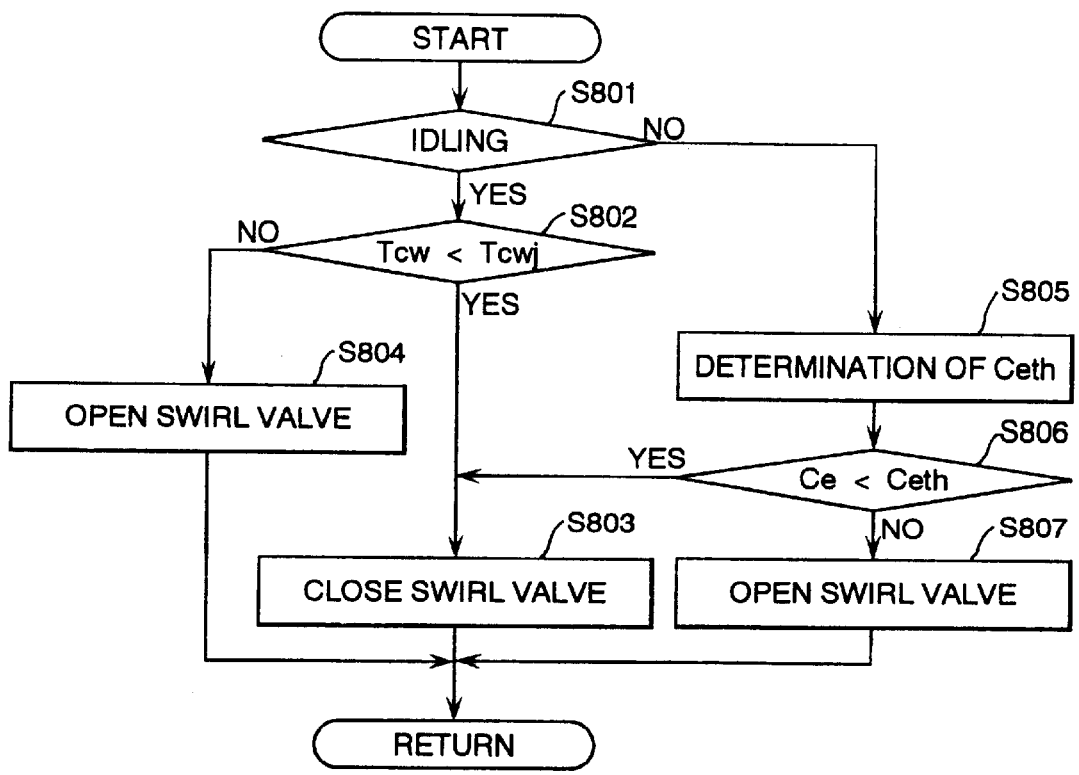
FIG. 31 is a flow chart illustrating a sequence routine of swirl valve control.

FIG. 31 is a flow chart illustrating a sequence routine of swirl valve control.

As shown, when the flow chart logic commences and control proceeds directly to a judgement at step S801 as to whether the engine is idling. When the throttle valve 14 is in its closed position and an engine speed Ne is higher than a specific speed, the engine is determined to be idling. When the engine 1 is idling, another judgement is made at step S802 as to whether a current cooling water temperature Tcw is lower than a specified temperature Tref, for example 60° C. When the current cooling water temperature Tcw is lower than the specified temperature Tref, this indicates that the engine 1 is cold, then, the swirl valve 18 is closed at step S803. When the current cooling water temperature Tcw is higher than the specified temperature Tref, this indicates that the engine 1 has been warmed up, then, the swirl valve 18 is opened at step S804. Accordingly, when the engine 1 is cold, the swirl valve 18 is closed to generate a swirl in the combustion chamber 6, promoting mixing fuel and air, as a result of which, aggravation of fuel vaporization due to cold engine operation is complemented and fuel ignitability is well maintained.

Figure 32:
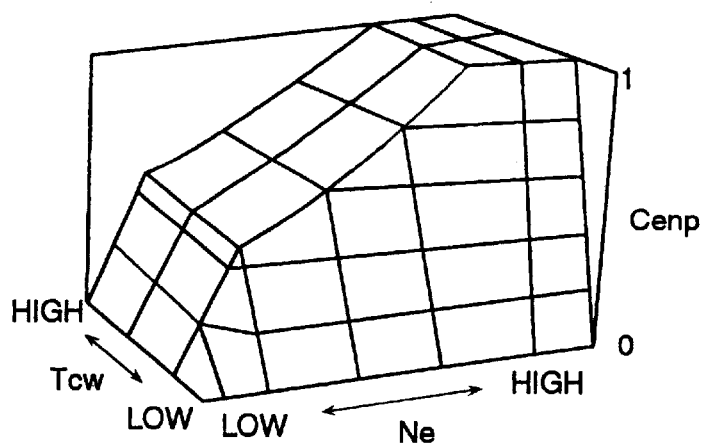
FIG. 32 is an illustration showing a swirl valve control mal.

On the other hand, when the engine 1 is not idling at step S801, a threshold air charging efficiency Ceth is determined based on with reference to an air charging efficiency map at step S805. As shown in FIG. 32 the air charging efficiency map specifies opening of the swirl valve 18 relative to cooling water temperature Tcw, engine speed Ne and air charging efficiency Ce. The swirl valve 18 is controlled to close in a range of lower cooling water temperatures, lower engine speeds and lower loading (lower air charging efficiency). Specifically, air charging efficiency) Ceref is determined as a threshold air charging efficiency Ceth according to a current engine speed Ne and a current cooling water temperature Tcw with reference to the air charging efficiency map. Subsequently, a current air charging efficiency Ce is compared with the threshold air charging efficiency Ceth at step S806. When the current air charging efficiency Ce is lower than the threshold air charging efficiency Ceth, the swirl valve 18 is closed at step S803. On the other hand, when the current air charging efficiency Ce is higher than the threshold air charging efficiency Ceth, the swirl valve 18 is opened at step S807.

As described above, while the engine 1 is not idling, the swirl valve 18 is controlled to be opened or closed based on cooling water temperature Tcw and engine speed Ne. During cold engine operation, the swirl valve 18 is opened to produce and maintain a swirl in the combustion chamber 6, complementing aggravation of fuel vaporization and promoting mixing of fuel and air. On the other hand, the swirl valve 18 is opened to secure a large intake air quantity in a range of higher engine speeds or to provide high engine output torque in a range of higher loading.

Figure 33:
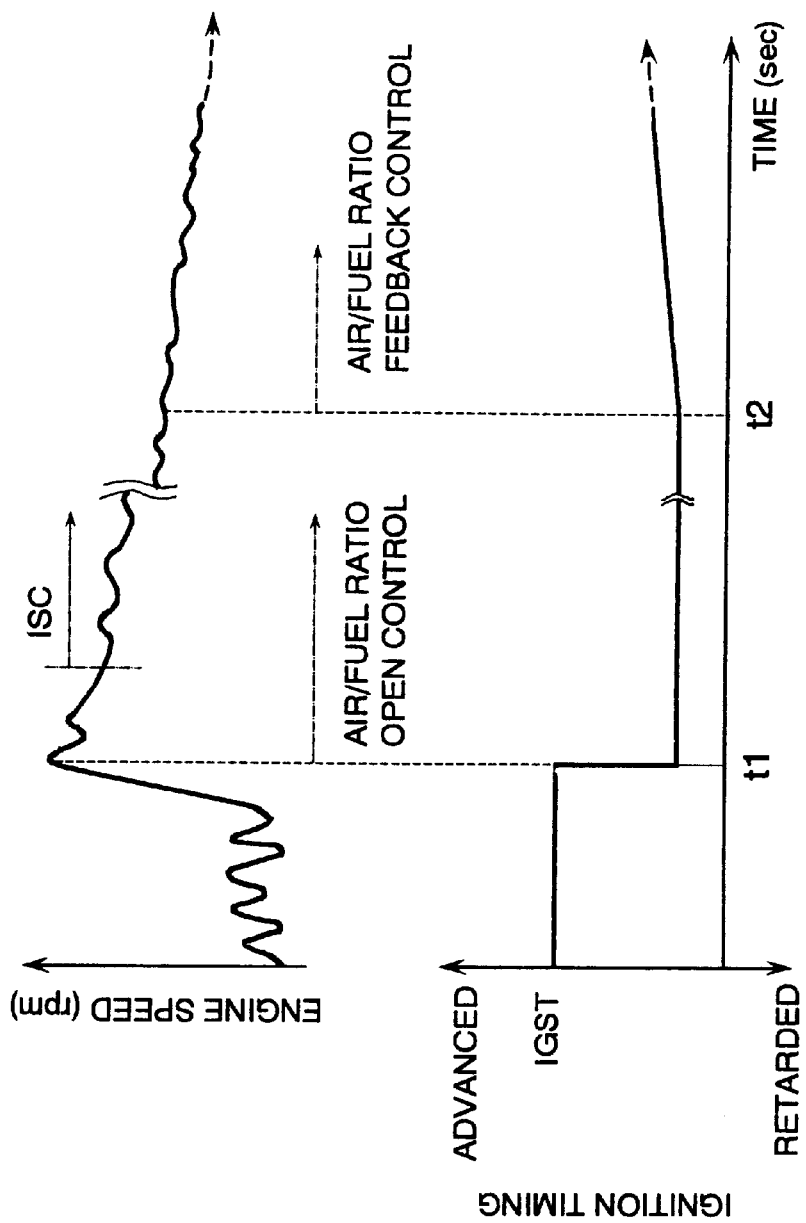
FIG. 33 is a graphical diagram showing the relationship between engine speed and ignition timing.

Accordingly, even in the event where the catalyst is not yet warmed up due to execution of the ignition timing control as vias previously described, acceleration of a rise in catalyst temperature is effected as well as securing combustion stability. Further, even if there occurs aggravation of ignitability and combustibility of a fuel due to deterioration, the above described effects are realized in its own quality. In this instance, as shown in FIG. 33, an air/fuel ratio is feedforward controlled for a period from an engine start at a time t1 to activation of the O2 sensor 26 at a time t2, as a result of which, combustion is stabilized complementing aggravation of fuel vaporization. This enables an ignition timing to be greatly retarded in order to give acceleration of a rise in catalyst temperature priority. The NOx emission level can be lowered by controlling an air/fuel ratio toward a rich side as shown in FIG. 25 and the emission level of carbon monoxide (CO) and hydrocarbons (HC) is prevented from rising by keeping an air/fuel ratio remain close to a stoichiometric air/fuel ratio (14.7).

After activation of the O2 sensor 26, the level of harmful emissions is lowered by feedback controlling the air/fuel ratio toward the stoichiometric air/fuel ratio (14.7) and utilizing a conversion function of the half-warmed catalyst. In other words, both acceleration of a rise in catalyst temperature and a reduction in harmful emissions during the acceleration of a rise in catalyst temperature are realized at a high-grade. Further, even during the control of retarding an ignition timing, the air charging efficiency is increased by execution of the idle speed control, so that the engine 1 is controlled to keep an idle speed and, as a result of which, the drier and passengers are prevented from loosing natural feeling.

FIG. 34 is a flow chart illustrating another variation of the sequence routine of the fuel injection control shown in FIG. 19. In the fuel injection control, until the O2 sensor 26 is warmed and activated, an air/fuel ratio is feedforward controlled to shift to a lean side higher than a stoichiometric air/fuel ratio.

As shown, when the flow chart logic commences and control proceeds directly to a function block at step S901 where the ECU 35 reads signals from the sensors and switches including at least the air flow sensor 13, the O2 sensor 26, the crankangle sensor 30 and the starter switch 33. Subsequently, a judgement is made at step S902 as to whether the engine 1 has been started. When the engine has been started, an injector pulse width Ta(n) is fixed at an starting pulse width T$_{STA}$ for a cylinder(n) at step S903. On the other hand, when there is no signal from the starter switch 33 or when the engine 1 is operating at a speed higher than the specified speed, the engine 1 is judged to be during a start, then judgements are made as to whether the temperature rising flag F$_{RTD}$ has been up at step S904 and whether an ignition timing correction flag F$_{RMIN}$ has been up at step S905. When both flags F$_{RTD}$ and F$_{RMIN}$ are up, then, at step S906, an enriching quantity of fuel injection C$_{RMIN}$(n) is determined by adding a control gain C$_{RR}$ to a previous enriching quantity of fuel injection C$_{RMIN}$'(n). On the other hand, when, while the temperature rising flag F$_{RTD}$ is up, the ignition timing correction flag F$_{RMIN}$ is down, then, at step S907, an enriching quantity of fuel injection C$_{RMIN}$(n) is determined by subtracting the control gain C$_{RR}$ from the previous enriching quantity of fuel injection C$_{RMIN}$'(n). After the determination of an enriching quantity of fuel injection C$_{RMIN}$(n) at step S906 or S907, a judgement is made at step S908 as to whether the enriching quantity of fuel injection C$_{RMIN}$(n) is equal to or less than 0 (zero). When, while the temperature rising flag F$_{RTD}$ is up, the enriching quantity of fuel injection C$_{RMIN}$(n) is equal to or less than 0 (zero) or when the temperature rising flag F$_{RTD}$ is down, the enriching quantity of fuel injection C$_{RMIN}$(n) is fixed at 0 (zero) at step S909. Subsequently, when the O2 sensor 26 has been suitably activated at step S910, after fixing an open control leaning correction value C$_{LOPN}$(n) to 0 (zero) at step S911, an air/fuel ratio feedback control correction value Cfb(i) is determined at step S912. On the other hand, when the O2 sensor 26 has not yet been activated at step S910, an open control leaning correction value C$_{LOPN}$(n) is determined at step S913, and an air/fuel ratio feedback control correction value Cfb(i) is Fixed at 0 (zero) at step S914.

When the enriching quantity of fuel injection C$_{RMIN}$(n) is greater than 0 (zero) at step S908, an open control leaning correction value CLOPN(n) is fixed at 0 (zero) at step S915, and an air/fuel ratio feedback control correction value Cfb(i) is fixed at 0 (zero) at step S916.

After the determination of an air/fuel ratio feedback control correction value Cfb(i) at step S912, S914 or S916, an injector pulse width Ta(n) is determined by the following expression at step S917:

$$Ta(n) = K_G K_F \times \{1 + (fb(i) + C_{RMIN}(n) - C_{LOPN}(n))\} \times Ce$$

Subsequently to the determination of an injector pulse width Ta(n) at step S903 or S917, after waiting a fuel injection timing at step S918, an injector pulse having the pulse width Ta(n) is provided to actuate the injector 16 for a cylinder (n) to spray fuel at step S919.

In this embodiment, before activation of the O2 sensor 26, a fuel injection quantity is feedforward controlled to shift an air/fuel ratio to a larger side between a stoichiometric ratio of 14.7 and a ratio of 17 in consideration of insufficient conversion performance of the catalyst before warm-up, so thal. the emission level of carbon monoxide (CO) and hydrocarbons (HC) is considerably lowered as shown in FIG. 25. Accordingly, even in the event where the catalyst is not yet warmed up due to execution of the ignition timing control as was previously described, acceleration of a rise in catalyst temperature is effected as well as securing combustion stability. Farther, when an air/fuel ratio is on a lean side but closer to a stoichiometric air/fuel ratio (for example between 14.7 and 17), the exhaust gas temperature is high, so that acceleration of a rise in catalyst temperature is realized. Furthermore, the emission level of carbon monoxide (CO) and hydrocarbons (HC) is considerably lowered, so that, even while the catalyst is at lower conversion efficiency, the level of harmful emissions is lowered.

In the above embodiments, although an advancing correction limit $\theta_{RMIN}$ to a roughness control variables $\theta_{rgh}$ is used to restrain a correction of ignition timing toward an advanced side (at steps S222 and S223 in FIG. 5), variations may occur to those skilled in the art. That is, the state of combustion may be directly detected on the basis of combustion pressure or an ion current crossing a spark plug to detect roughness of combustion. It is not always necessary to shift a stoichiorietric air/fuel ratio as a target air/fuel ratio toward a rich side when it is hard to restrain fluctuations of crankangular velocity sufficiently even by an advancing correction of the ignition timing and it may be done to always maintain a stoichiometric air/fuel ratio. Otherwise, a target air/fuel ratio may be shifted to such an air/fuel ratio smaller than a stoichiametric air/fuel ratio that the NOx emission level shown in FIG. 25 is further lowered or the conversion efficiency for hydrocarbons (HC) and carbon monoxide (CO) shown in FIG. 26 is sufficiently increased.

In the second embodiment, although an air/fuel ratio is feedforward controlled to shift toward a rich side for a period from an engine start to activation of the O2 sensor 26, it may be done to control an air/fuel ratio toward a rich side for an early stage of an engine start until a specified time passes immediately after the engine start as well as restraining an advancing correction of ignition timing by the roughness control. This enables an ignition timing to be retarded in order to give acceleration of a rise in catalyst temperature priority at the early stage and to shift an air/fuel ratio to a rich side so as to secure combustion stability.

The judgement as to whether the catalyst has been warmed up may be made based directly on an temperature of the catalyst converter in place of a cooling water temperature. The detection of a crankangular velocity fluctuation and the ignition timing control may be performed not for each cylinder but for all cylinder at once.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A fuel combustion control system for an internal combustion engine for controlling ignition timing and air/fuel ratio so as to cause a rise in exhaust gas temperature while an exhaust gas purifying catalyst installed in an exhaust line of the engine is insufficiently warmed, said fuel combustion control system comprising:

speed monitoring means for monitoring an engine speed;

temperature monitoring means for monitoring engine cooling water temperature, and control means for detecting a degree of fluctuations of said engine speed, determining on the basis of said temperature whether said engine is still in a cold condition, controlling said ignition timing to a retarded condition so as to cause a rise in exhaust gas temperature while said engine is in said cold condition and to advance from said retarded ignition timing by a timing degree which is necessary to cause a rise in catalyst temperature but less than a predetermined timing degree while said degree of fluctuations is greater than a predetermined value, and controlling an air/fuel ratio to gain a value on an lean side of stoichiometric value represented by an air excess ratio ($\lambda=1$) while said engine is in said cold condition and to turn back said value of air/fuel ratio toward a rich side of said stoichiometric value when said ignition timing is advanced by said predetermined timing degree.

2. The fuel combustion system as defined in claim 1, wherein said value of air/fuel ratio is set between said stoichiometric value and 17.

3. The fuel combustion control system as defined in claim 1, wherein said control means determines that the engine is in said cold condition (while) when said engine cooling water temperature is lower than a predetermined temperature.

4. The fuel combustion control system as defined in claim 3, wherein said control means determines that said exhaust gas purifying catalyst is insufficiently warmed while the engine is in said cold condition for a predetermined period of time after a cold engine start.

5. The fuel combustion control system as defined in claim 1, and further comprising a temperature sensor for monitoring a temperature of engine cooling water and air flow control means for controlling an air flow in an combustion chamber of the engine, wherein said control means determines that the engine is cold while said temperature of engine cooling water is lower than a predetermined temperature and actuates said air flow control means to enhance said air flow while the engine is cold.

6. The fuel combustion control system as defined in claim 1, wherein said control means includes an air/fuel ratio sensor disposed in said exhaust line to detect said air/fuel ratio and performs air/fuel ratio control so as to gain an air/fuel ratio on an lean side of a stoichiometric value represented by an air excess ratio ($\lambda=1$) while said air/fuel ratio sensor remains inactive and performs air/fuel ratio feedback control based on said air/fuel ratio detected by said air/fuel ratio sensor after said air/fuel ratio sensor has been activated.

7. The fuel combustion control system as defined in claim 1, and further comprising variable air intake means for increasingly and decreasingly changing intake air quantity bypassing an engine throttle and admitted to the engine and an idle sensor for detecting engine idling, wherein said control means controls said variable air intake means to increase intake air quantity so as to rise an engine speed higher than a predetermined idle speed when the engine is cold after an engine start.

8. The fuel combustion control system as defined in claim 1, wherein said control means determines said degree of fluctuation of engine speed for every cylinder and controls fuel combustion for every cylinder.

9. The fuel combustion control system as defined in claim 1, wherein the exhaust gas purifying catalyst is disposed downstream from an exhaust manifold connected to the exhaust line.

10. The fuel combustion control system as defined in claim 1, and further comprising an air flow control means for controlling air flow that is admitted into a combustion chamber of the engine, wherein said control means controls said air flow control means so as to increase an amount of said air flow while the engine is in said cold condition.

11. The fuel combustion control system as defined in claim 10, and further comprising idle detecting means for detecting that the engine is idling, wherein said control means controls said air flow control means so as to increase an amount of said air flow with an effect of increasing said engine speed when the engine is idling.

* * * * *